US010654573B2

(12) United States Patent
Movsesian et al.

(10) Patent No.: US 10,654,573 B2
(45) Date of Patent: May 19, 2020

(54) SEATING-SYSTEM KITS AND METHODS OF CONFIGURING SEATING SYSTEMS

(71) Applicant: The Boeing Company, Chicago, IL (US)

(72) Inventors: Sami Movsesian, Glendale, CA (US); Jun Chen, Irvine, CA (US)

(73) Assignee: The Boeing Company, Chicago, IL (US)

(*) Notice: Subject to any disclaimer, the term of this patent is extended or adjusted under 35 U.S.C. 154(b) by 365 days.

(21) Appl. No.: 15/793,496

(22) Filed: Oct. 25, 2017

(65) Prior Publication Data
US 2019/0118954 A1    Apr. 25, 2019

(51) Int. Cl.
B64D 11/06 (2006.01)
B60N 2/015 (2006.01)
B63B 29/06 (2006.01)
B60N 2/01 (2006.01)
B60N 2/06 (2006.01)
B63B 29/04 (2006.01)
B64C 1/18 (2006.01)
B60N 2/02 (2006.01)

(52) U.S. Cl.
CPC ............ *B64D 11/0696* (2013.01); *B60N 2/01* (2013.01); *B60N 2/015* (2013.01); *B60N 2/06* (2013.01); *B63B 29/06* (2013.01); *B60N 2002/0208* (2013.01); *B63B 2029/043* (2013.01); *B64C 1/18* (2013.01)

(58) Field of Classification Search
CPC . B60N 2/015; B60N 2/01; B60N 2/06; B60N 2002/0208; B64C 1/18; B64C 1/20; B64D 11/0696; B64D 11/0601; B63B 29/06; B63B 2029/043

USPC ........................................................ 244/118.6
See application file for complete search history.

(56) References Cited

U.S. PATENT DOCUMENTS 3,893,729 A      7/1975  Sherman et al.
4,881,702 A *  11/1989  Slettebak ........... B64D 11/0693
                                                              244/118.6
5,131,607 A *   7/1992  Arnold .................... B64D 11/06
                                                              244/118.6

(Continued)

OTHER PUBLICATIONS

"European Application Serial No. 18201695.6, Search Report dated Jan. 28, 2019", 8 pgs.

(Continued)

*Primary Examiner* — Claude J Brown
(74) *Attorney, Agent, or Firm* — Kwan & Olynick LLP

(57) ABSTRACT

Provided is a seating-system kit for a vehicle that comprises floor beams, a primary pair of seat tracks, attached to the floor beams, and a first seat assembly, comprising a first seat support and a first plurality of seats, attached to the first seat support. The first seat support is attached to the primary pair of seat tracks and the floor beams support floor panels that define a floor surface. The vehicle has a virtual longitudinal plane, perpendicular to the floor surface, and a virtual longitudinal axis, parallel to the floor surface and lying in the virtual longitudinal plane. The seating-system kit comprises a secondary pair of seat tracks and a second seat assembly, comprising a second seat support and a second plurality of seats, attached to the second seat support, and wherein the second seat support is configured to be attached to the secondary pair of seat tracks.

40 Claims, 14 Drawing Sheets

(56) References Cited

U.S. PATENT DOCUMENTS

| | | | | |
|---|---|---|---|---|
| 7,857,259 B2* | 12/2010 | Baatz | ............... | B64C 1/20 |
| | | | | 244/118.6 |
| 8,152,101 B2* | 4/2012 | Law | ............... | B64D 11/06 |
| | | | | 244/118.5 |
| 8,172,195 B2* | 5/2012 | Fanucci | ............... | B63B 29/06 |
| | | | | 248/429 |
| 2008/0179458 A1 | 7/2008 | Ponzo de Siqueira et al. | | |
| 2009/0321565 A1* | 12/2009 | Barmichev | ............... | B64D 11/00 |
| | | | | 244/118.5 |
| 2010/0109400 A1* | 5/2010 | Kneller | ............... | B64D 11/0693 |
| | | | | 297/284.3 |
| 2011/0068226 A1* | 3/2011 | Baatz | ............... | B64C 1/20 |
| | | | | 244/118.6 |
| 2011/0233337 A1 | 9/2011 | Pozzi et al. | | |
| 2013/0080357 A1* | 3/2013 | Boren | ............... | B64D 11/06 |
| | | | | 705/500 |
| 2015/0108273 A1* | 4/2015 | Oleson | ............... | B64C 1/20 |
| | | | | 244/120 |
| 2015/0367931 A1* | 12/2015 | Cullen | ............... | B64D 9/003 |
| | | | | 244/118.1 |
| 2017/0158334 A1* | 6/2017 | Wolgast | ............... | B64C 1/20 |

OTHER PUBLICATIONS

European Application No. 18201695.6, Office Action dated Mar. 16, 2020.

\* cited by examiner

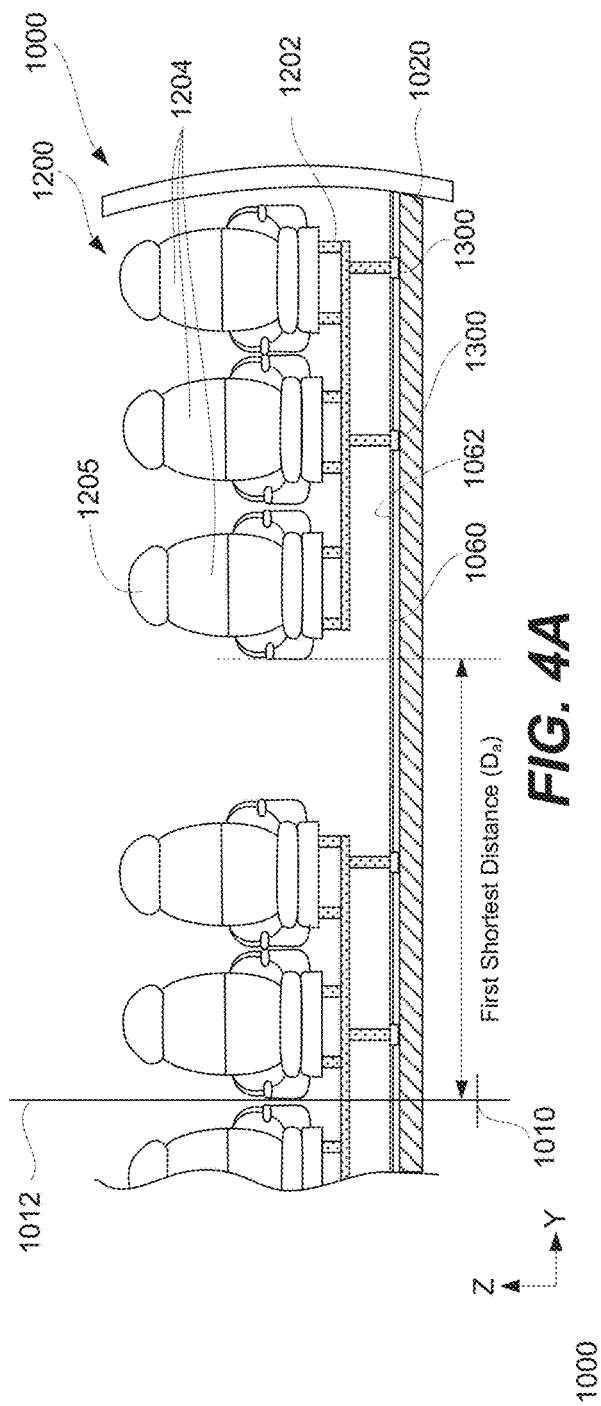
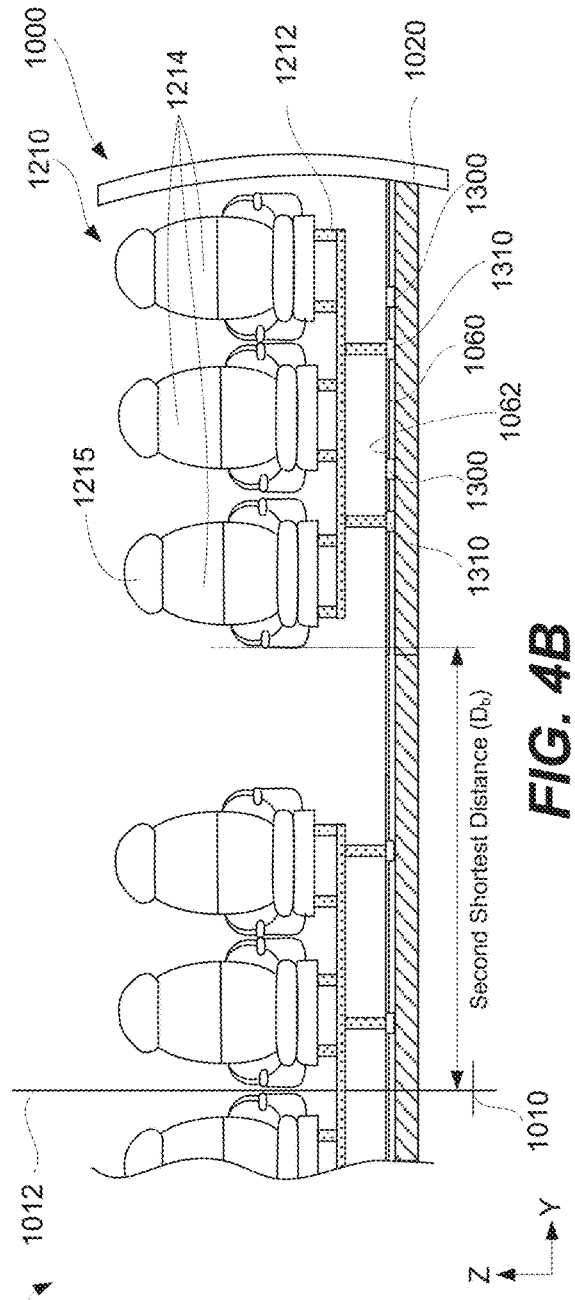

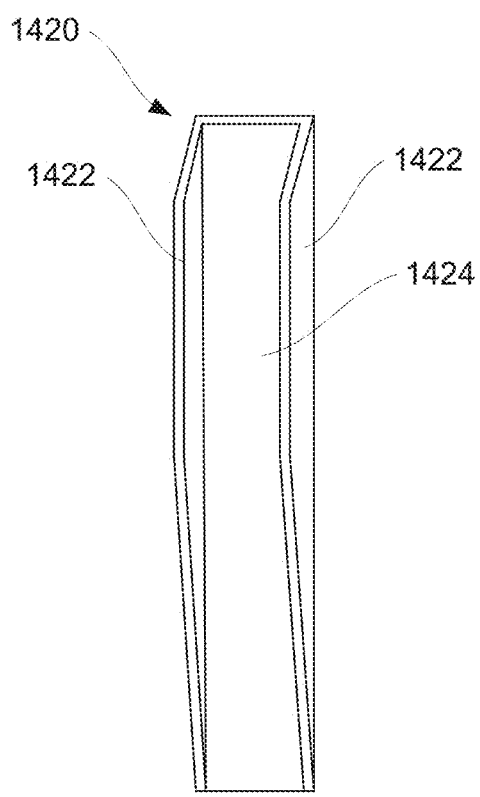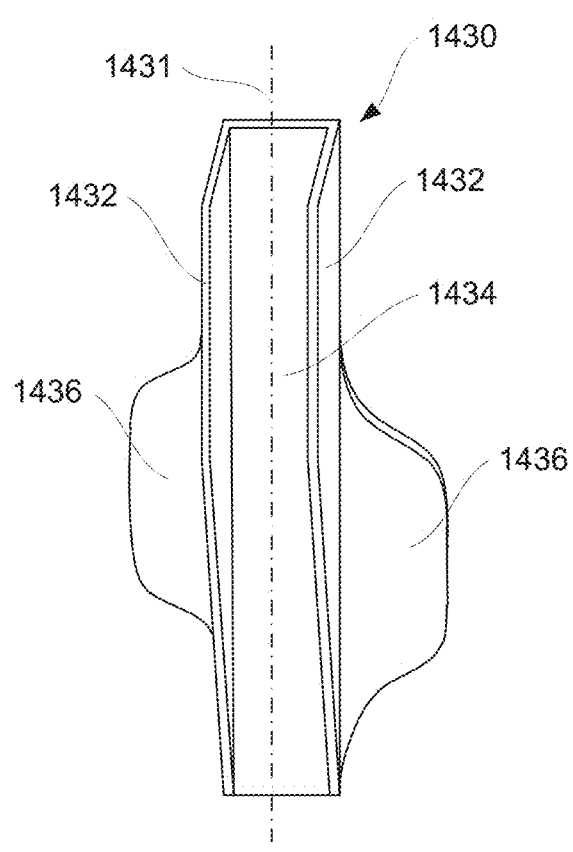
FIG. 5C-1    FIG. 5C-2

SEATING-SYSTEM KITS AND METHODS OF CONFIGURING SEATING SYSTEMS

TECHNICAL FIELD

The present disclosure relates to seating systems, seating-system kits, and methods of configuring seating systems.

BACKGROUND

Passenger vehicles, such as airplanes, are equipped with seats to provide comfortable and safe travel for the passengers. These seats are a part of a seating system, which includes components for attaching individual seats to other parts of the vehicle. Generally, seating arrangements in a passenger vehicle, such as an airplane, are fixed and cannot be easily altered after fabrication of the vehicle is completed. However, the seating needs may change once the vehicle is placed in service.

SUMMARY

Accordingly, apparatuses and methods, intended to address at least the above-identified concerns, would find utility The following is a non-exhaustive list of examples, which may or may not be claimed, of the subject matter according to the invention.

One example of the subject matter according to the invention relates to a seating system for a vehicle. The vehicle comprises floor beams, which support floor panels that define a floor surface. The vehicle has a virtual longitudinal plane, perpendicular to the floor surface. The vehicle also has a virtual longitudinal axis, parallel to the floor surface and lying in the virtual longitudinal plane. The seating system comprises a primary pair of seat tracks, a secondary pair of seat tracks, one of which is positioned between seat tracks of the primary pair of seat tracks, and a first seat assembly. The first seat assembly comprises a first seat support and a first plurality of seats, attached to the first seat support. The first seat support is attached to the primary pair of seat tracks.

Another example of the subject matter according to the invention relates to a seating-system kit for a vehicle that comprises floor beams, a primary pair of seat tracks, attached to the floor beams, and a first seat assembly. The first seat assembly comprises a first seat support and a first plurality of seats, attached to the first seat support. The first seat support is attached to the primary pair of seat tracks. The floor beams support floor panels that define a floor surface. The vehicle has a virtual longitudinal plane, perpendicular to the floor surface. The vehicle also has a virtual longitudinal axis, parallel to the floor surface and lying in the virtual longitudinal plane. The seating-system kit comprises a secondary pair of seat tracks and a second seat assembly. The second seat assembly comprises a second seat support and a second plurality of seats, attached to the second seat support. The second seat support is configured to be attached to the secondary pair of seat tracks.

Yet another example of the subject matter according to the invention relates to a seating-system kit for a vehicle that comprises floor beams and a primary pair of seat tracks, attached to the floor beams. The seating-system kit comprises a secondary pair of seat tracks, a plurality of struts, a doubler, and a spacer. The plurality of struts comprises at least one of a first strut or a second strut. The plurality of struts is configured to provide a coupling interface between the secondary pair of seat tracks and the floor beams. The doubler is configured to at least partially cover an opening in one of the floor beams. The spacer is configured to be positioned in the opening in the one of the floor beams. At least a portion of the spacer is between the doubler and the second strut when the second strut and the doubler are attached to the one of the floor beams. The first strut is geometrically different from the second strut.

Yet another example of the subject matter according to the invention relates to a method of configuring a seating system of a vehicle that comprises floor beams. The seating system comprises a primary pair of seat tracks, attached to the floor beams and supporting a first seating assembly. The method comprises attaching a secondary pair of seat tracks to the floor beams of the vehicle such that one of the secondary pair of seat tracks is positioned between seat tracks of the primary pair of seat tracks.

BRIEF DESCRIPTION OF THE DRAWINGS

Figure 1:
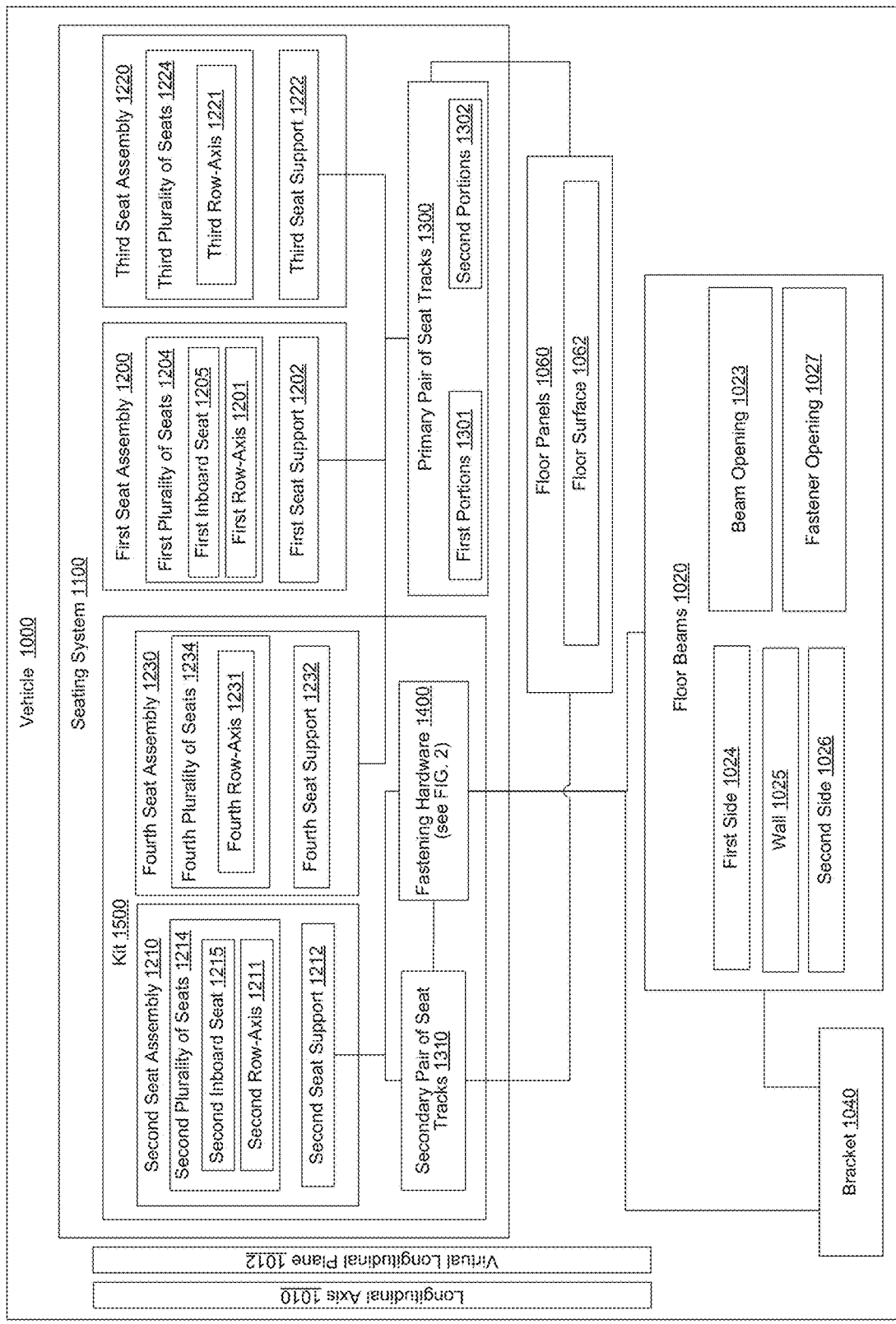
Figure 2:
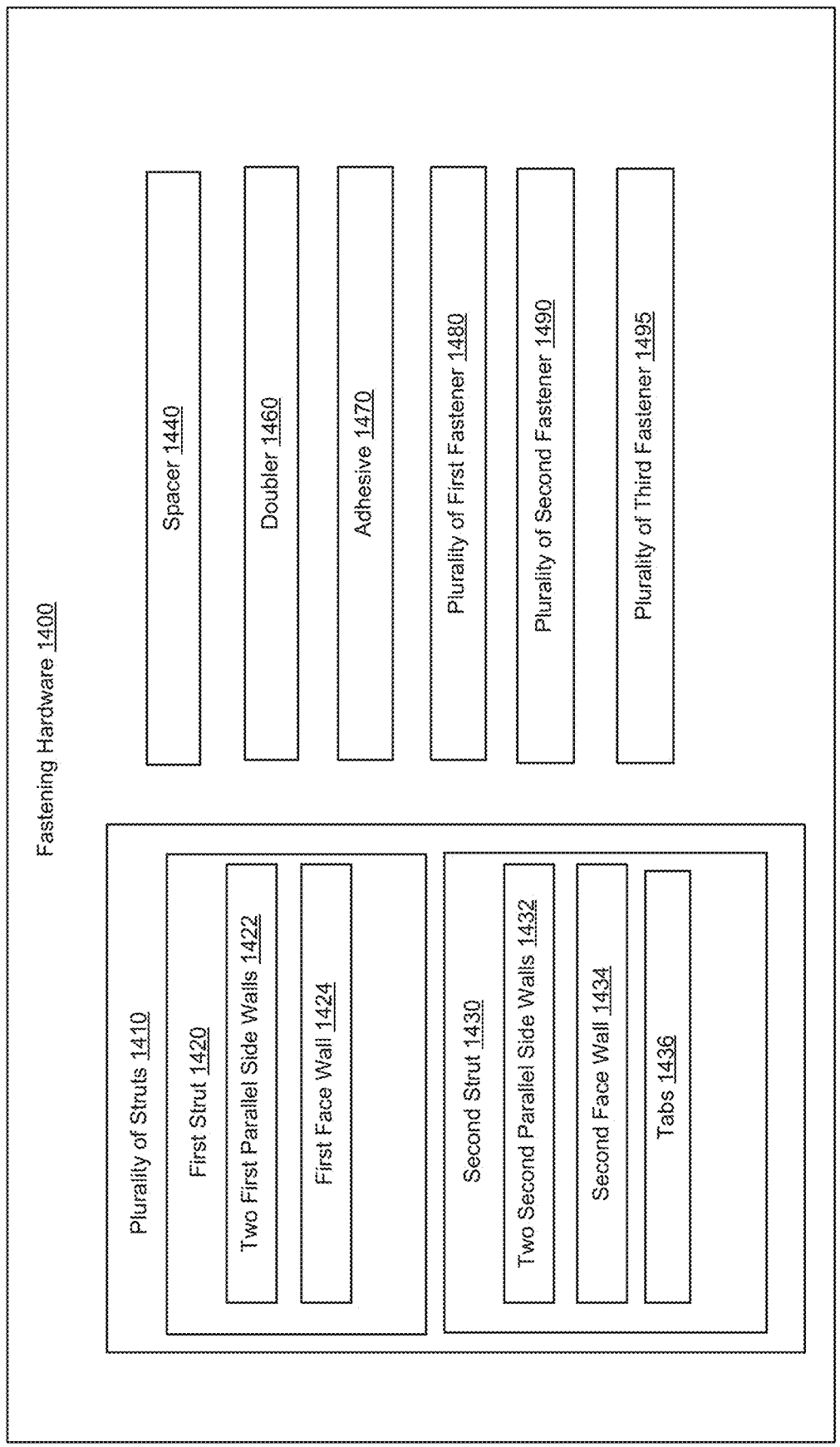
Figure 3A:
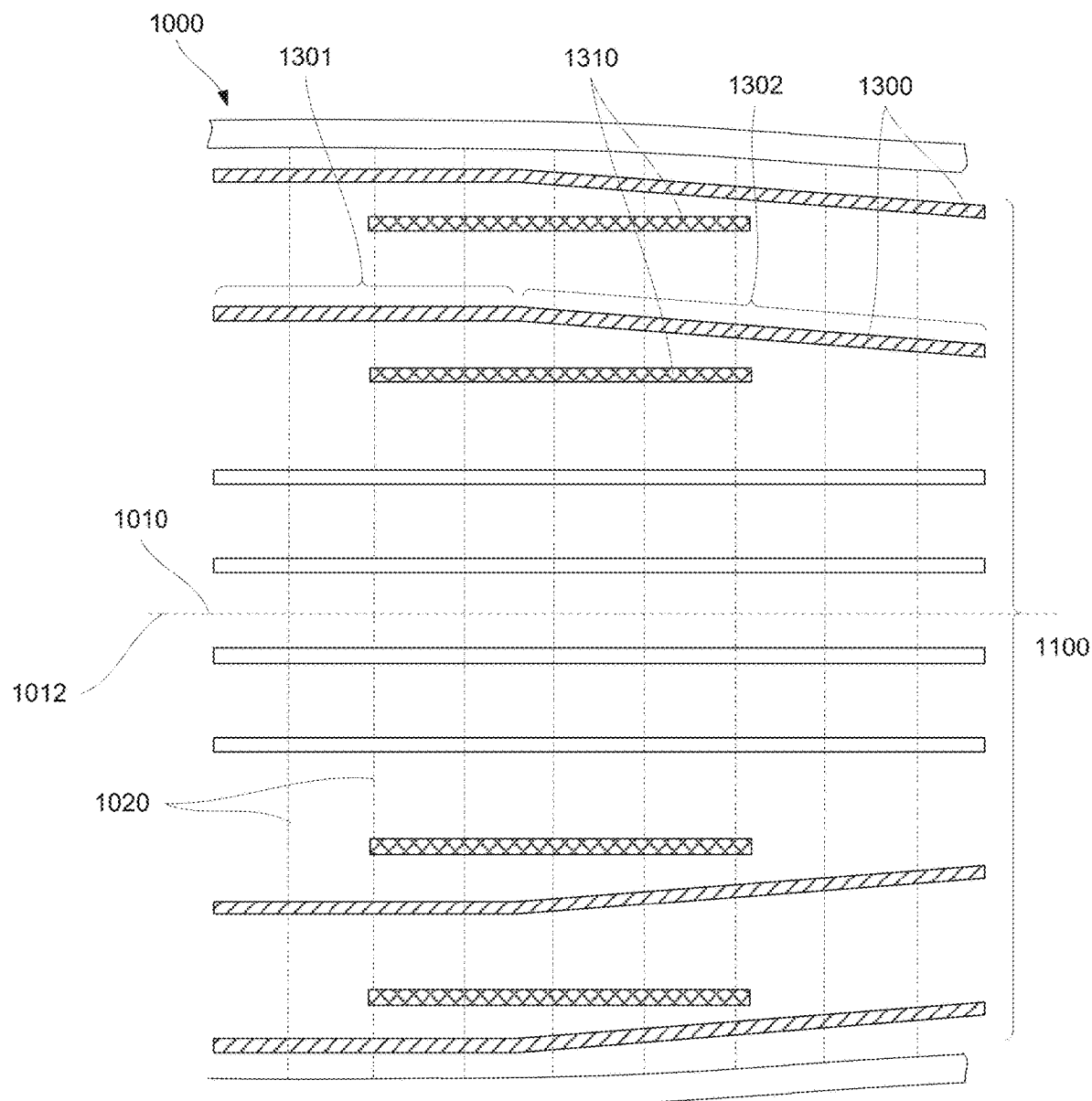
Figure 3B:
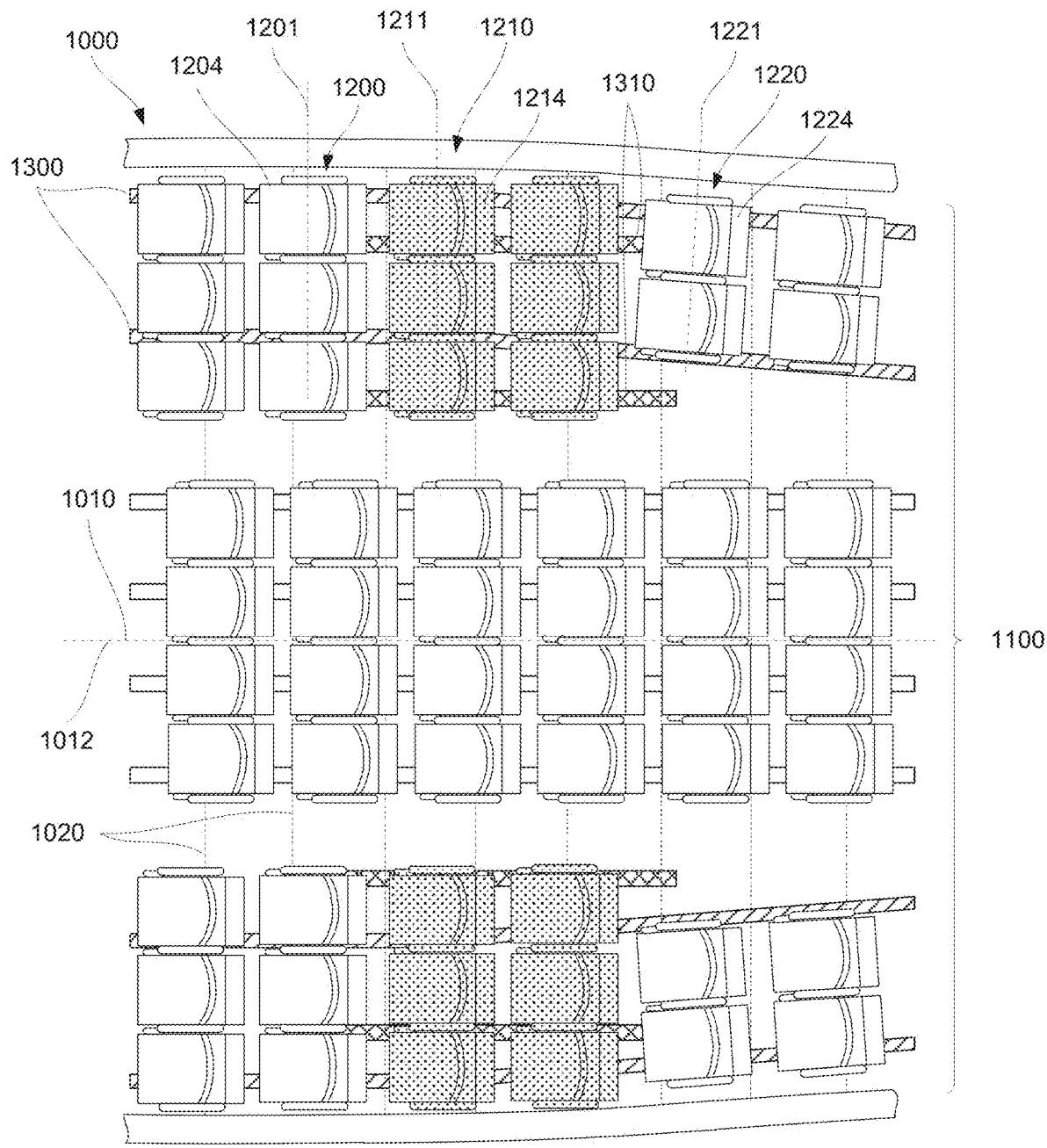
Figure 3C:
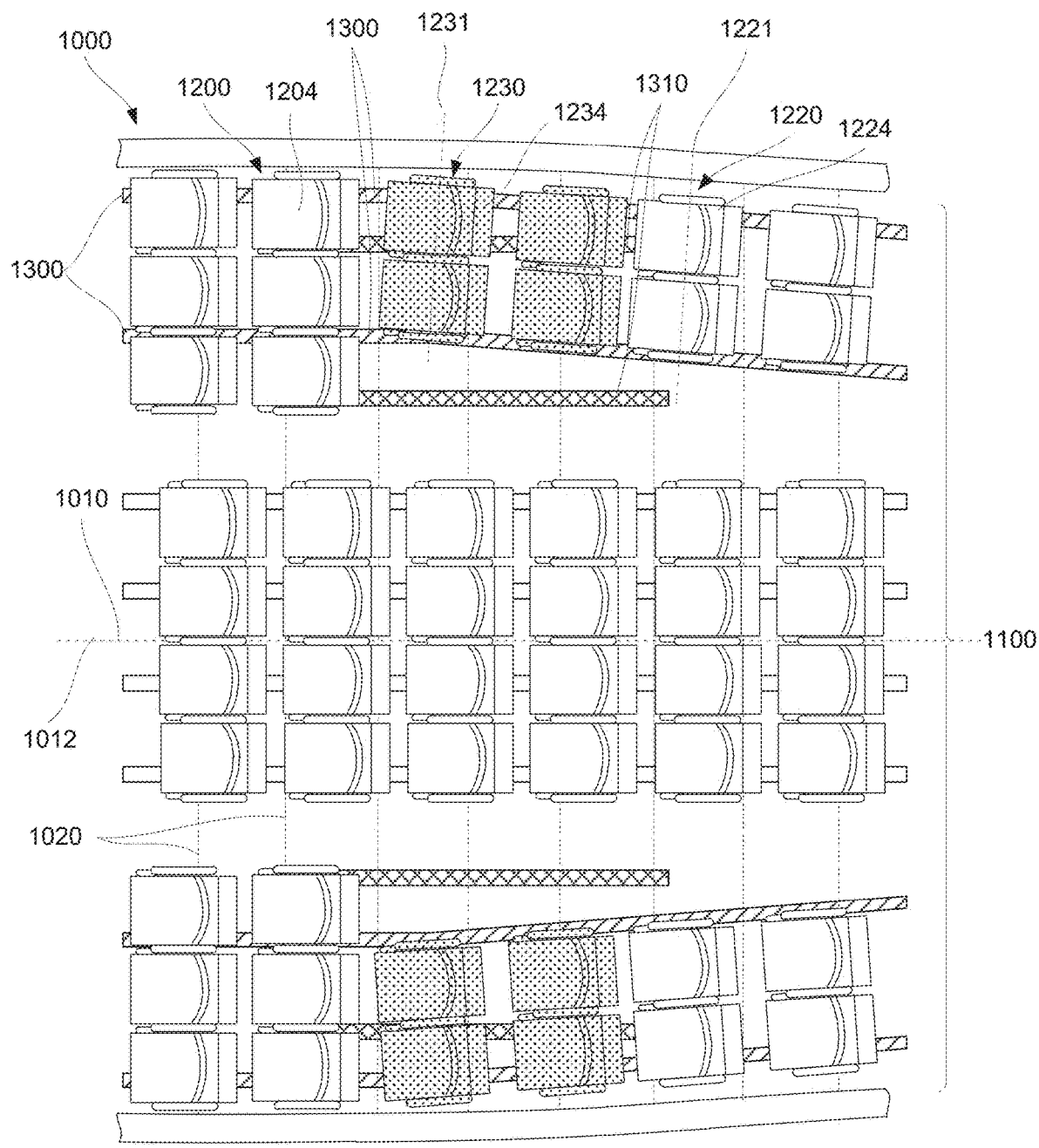
Figure 5A:
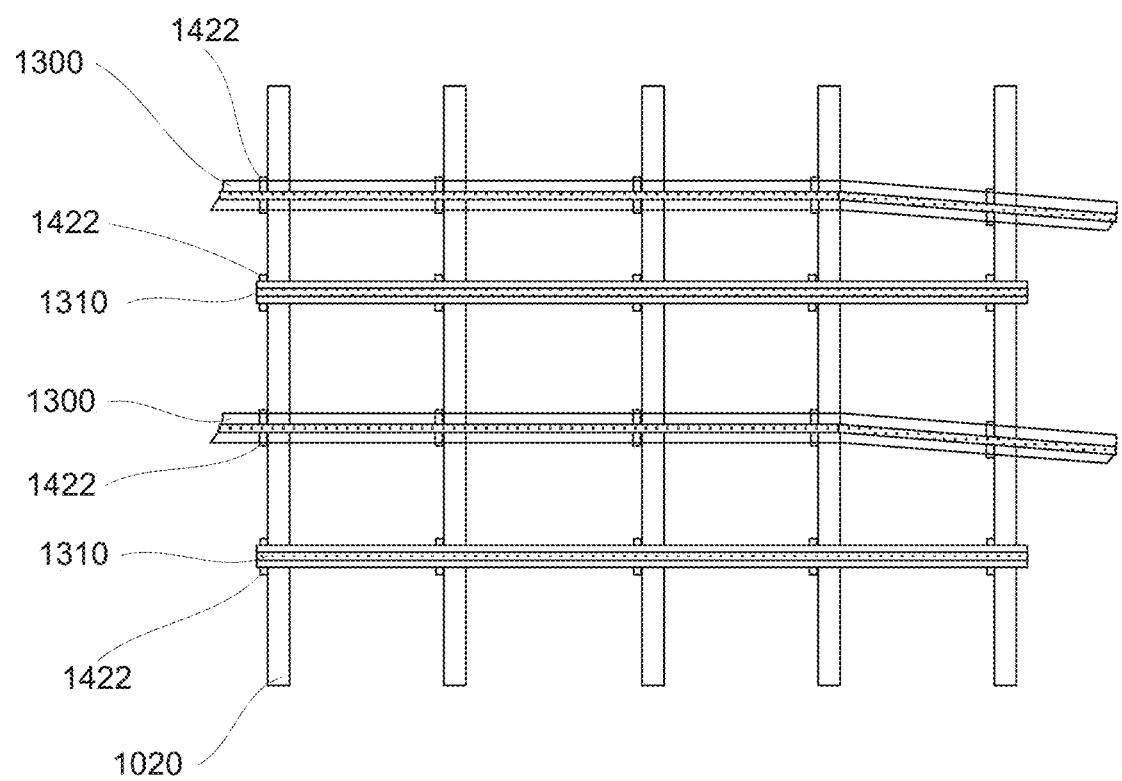
Figure 5B:
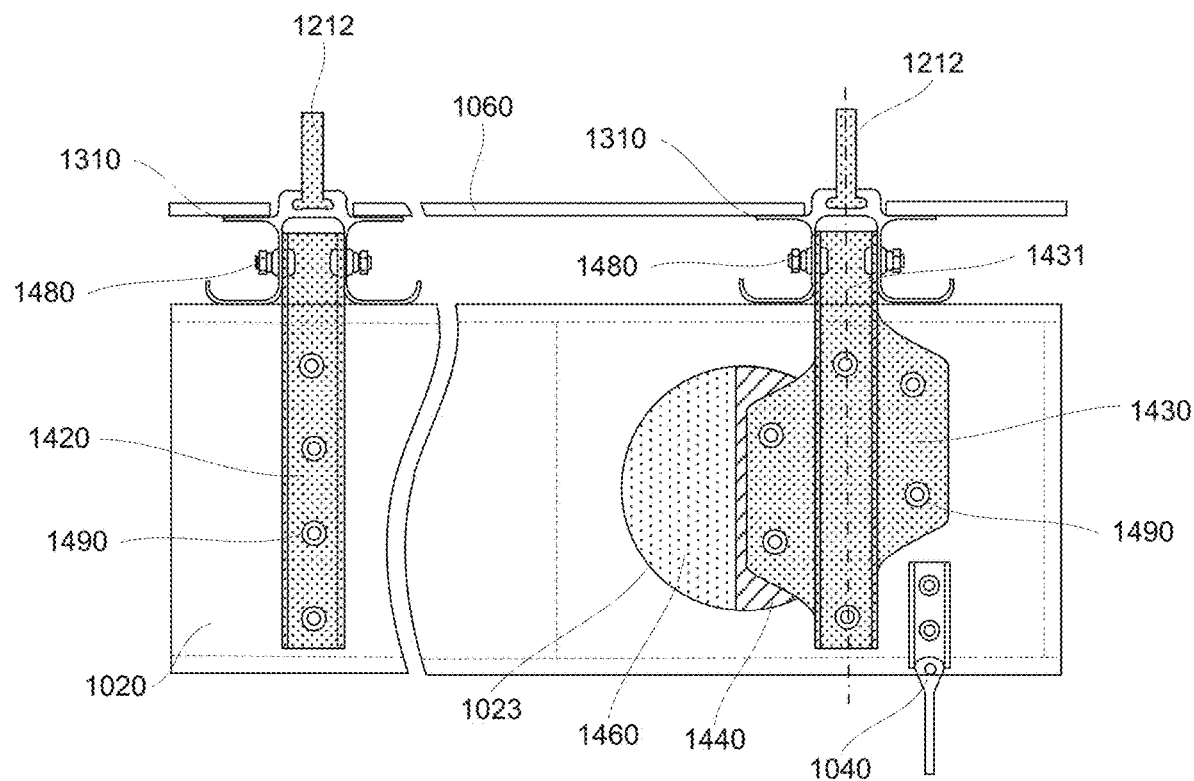
Figure 5D:
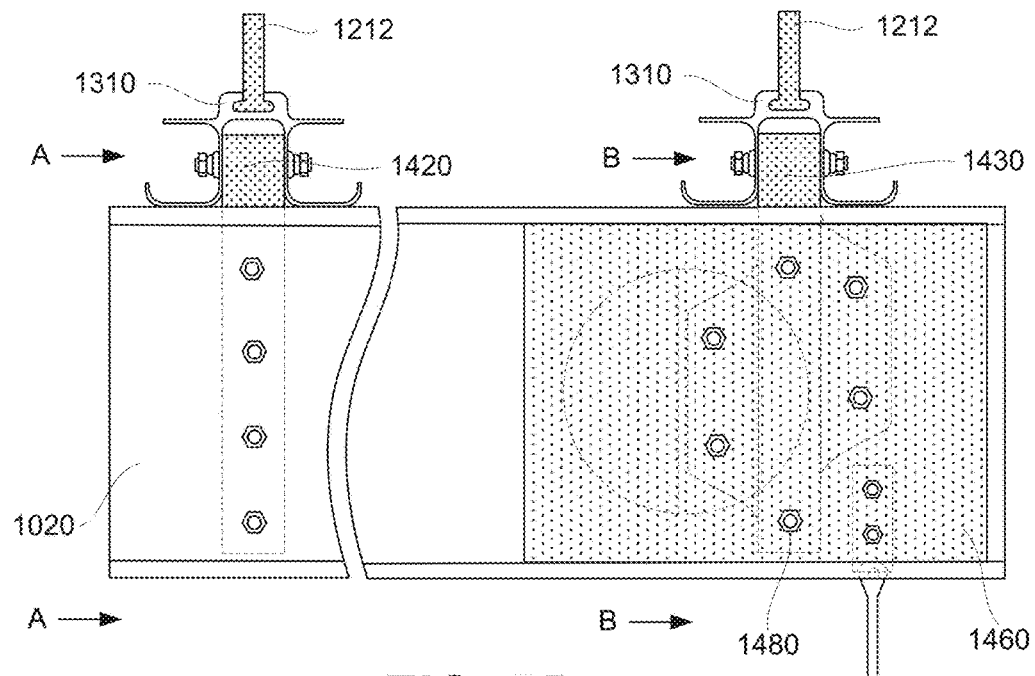
Figure 5E:
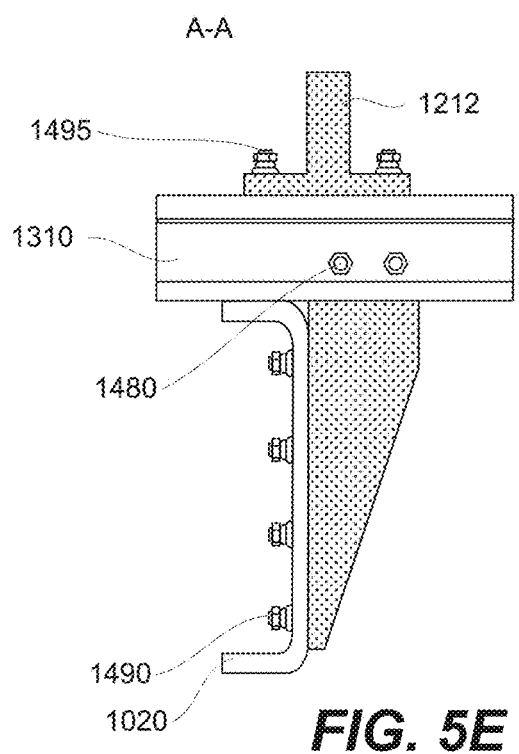
Figure 5F:
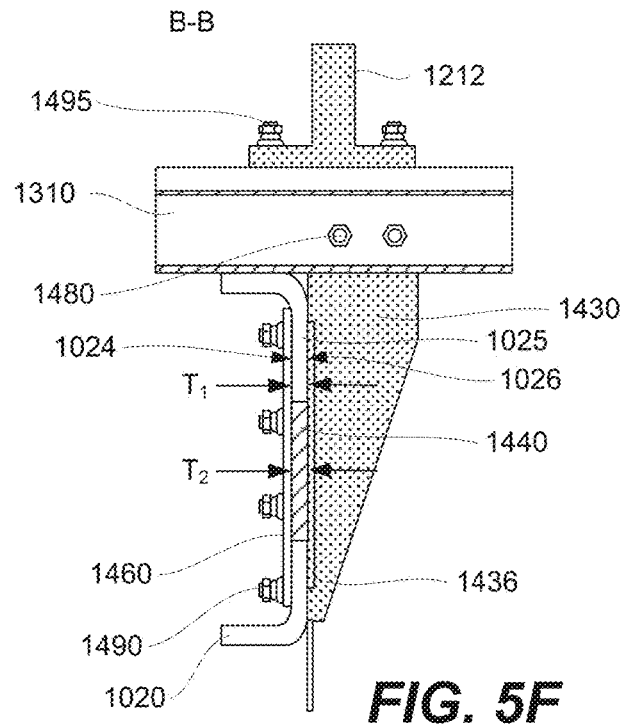
Figure 5G:
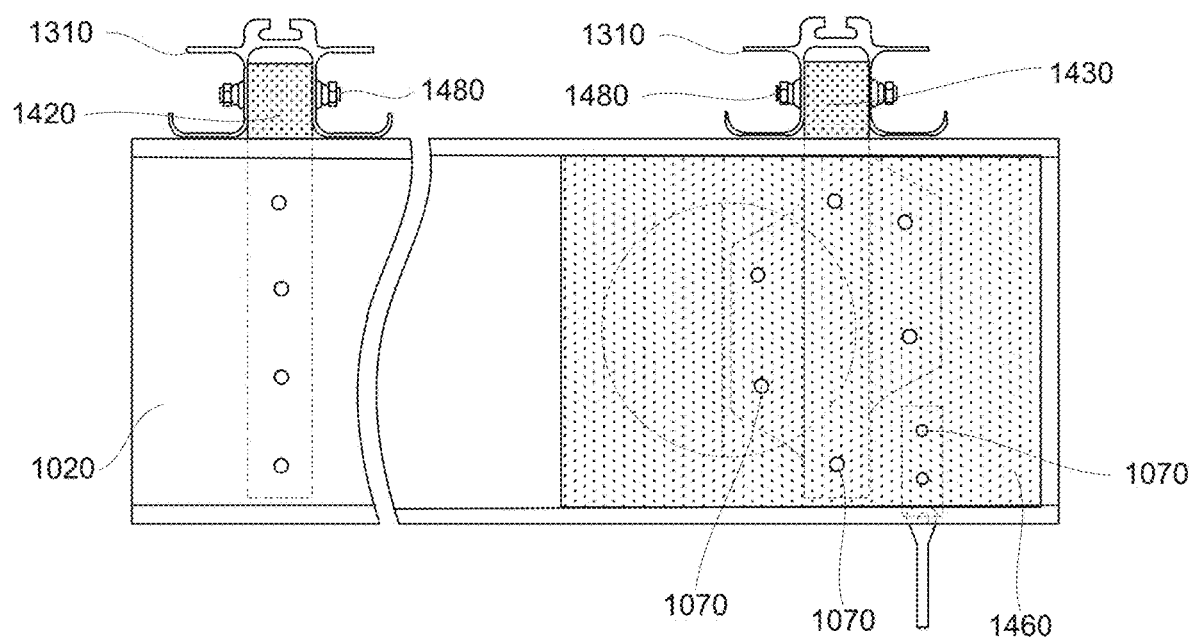
Figure 6:
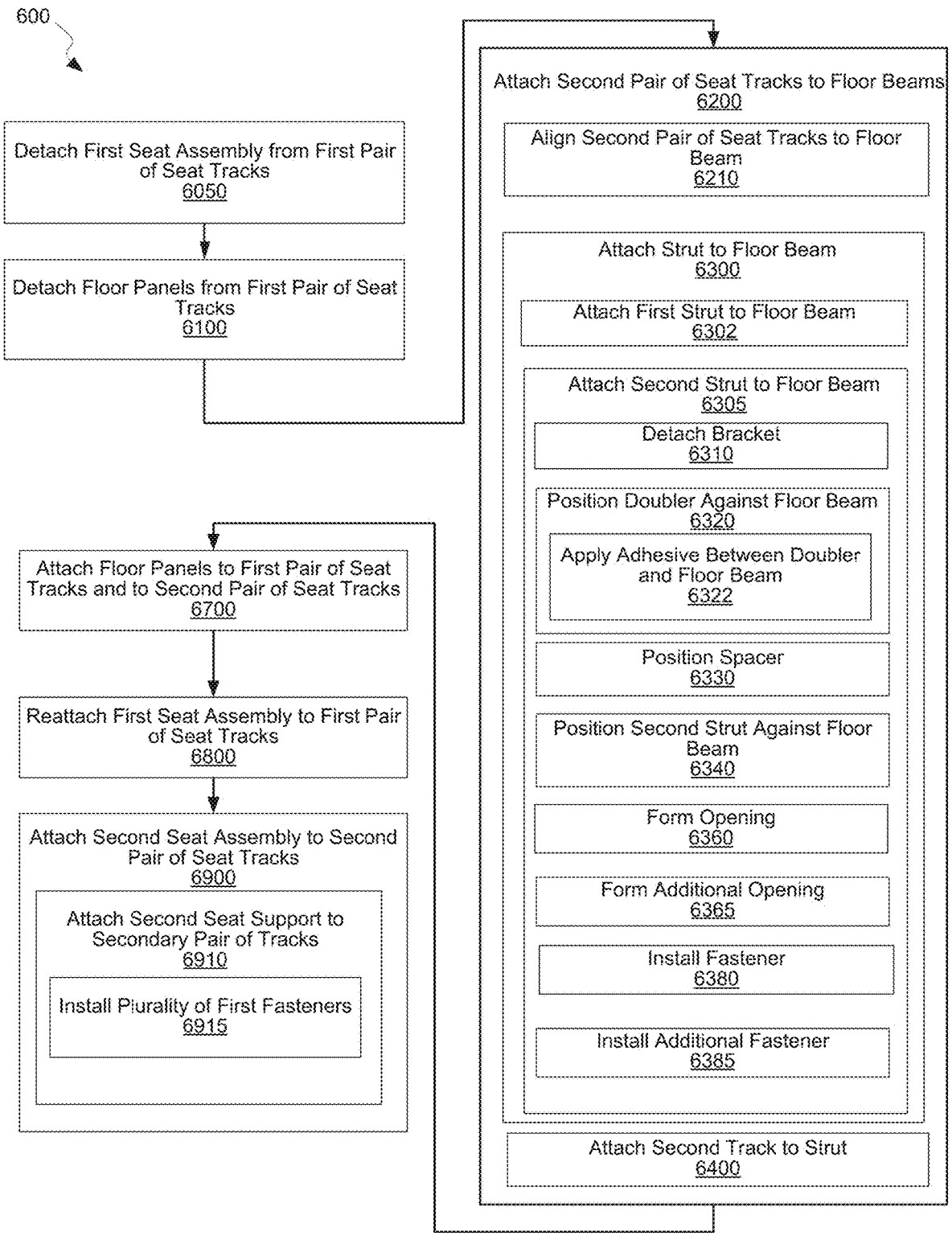
Figure 7:
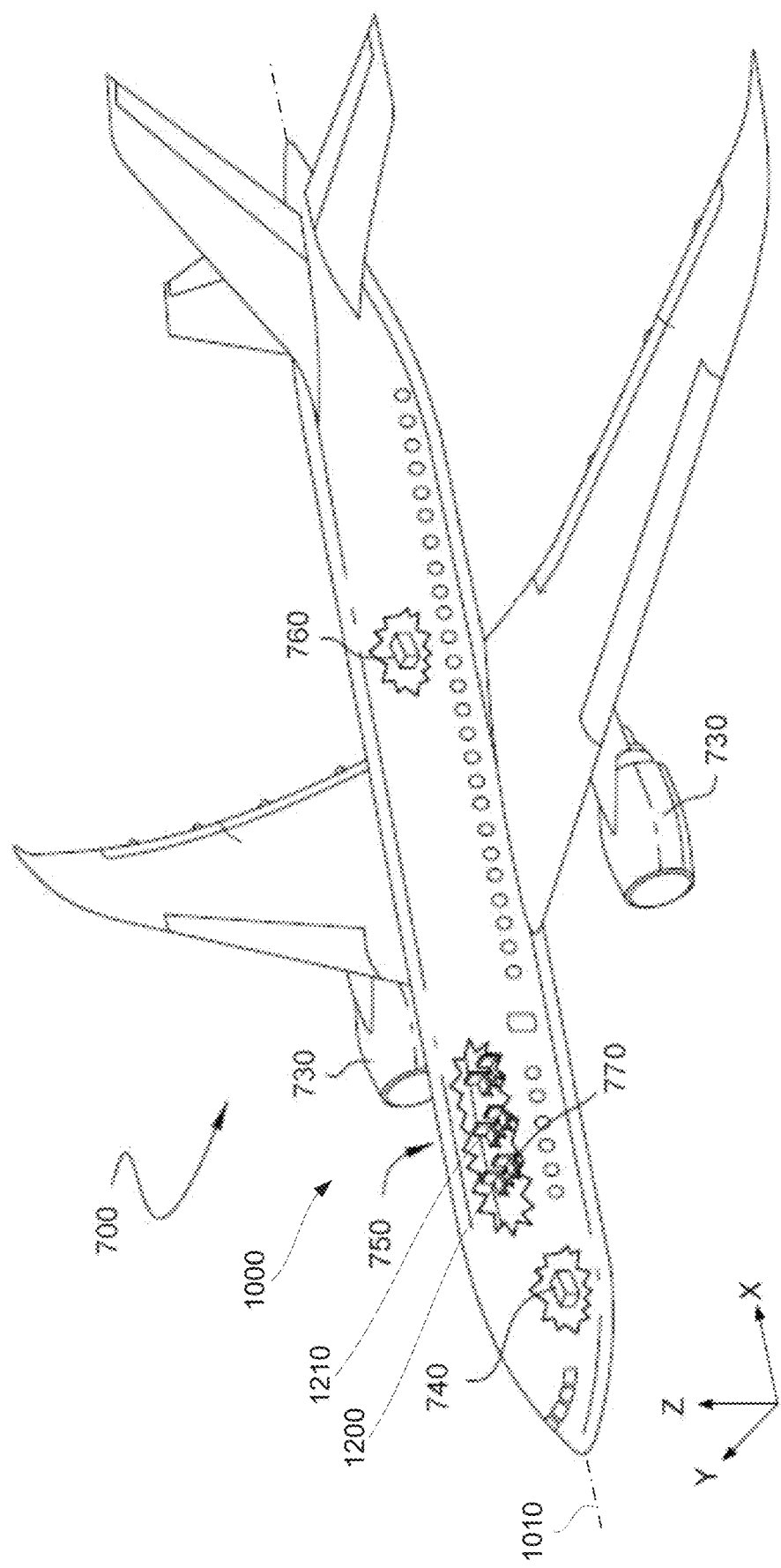
Figure 8:
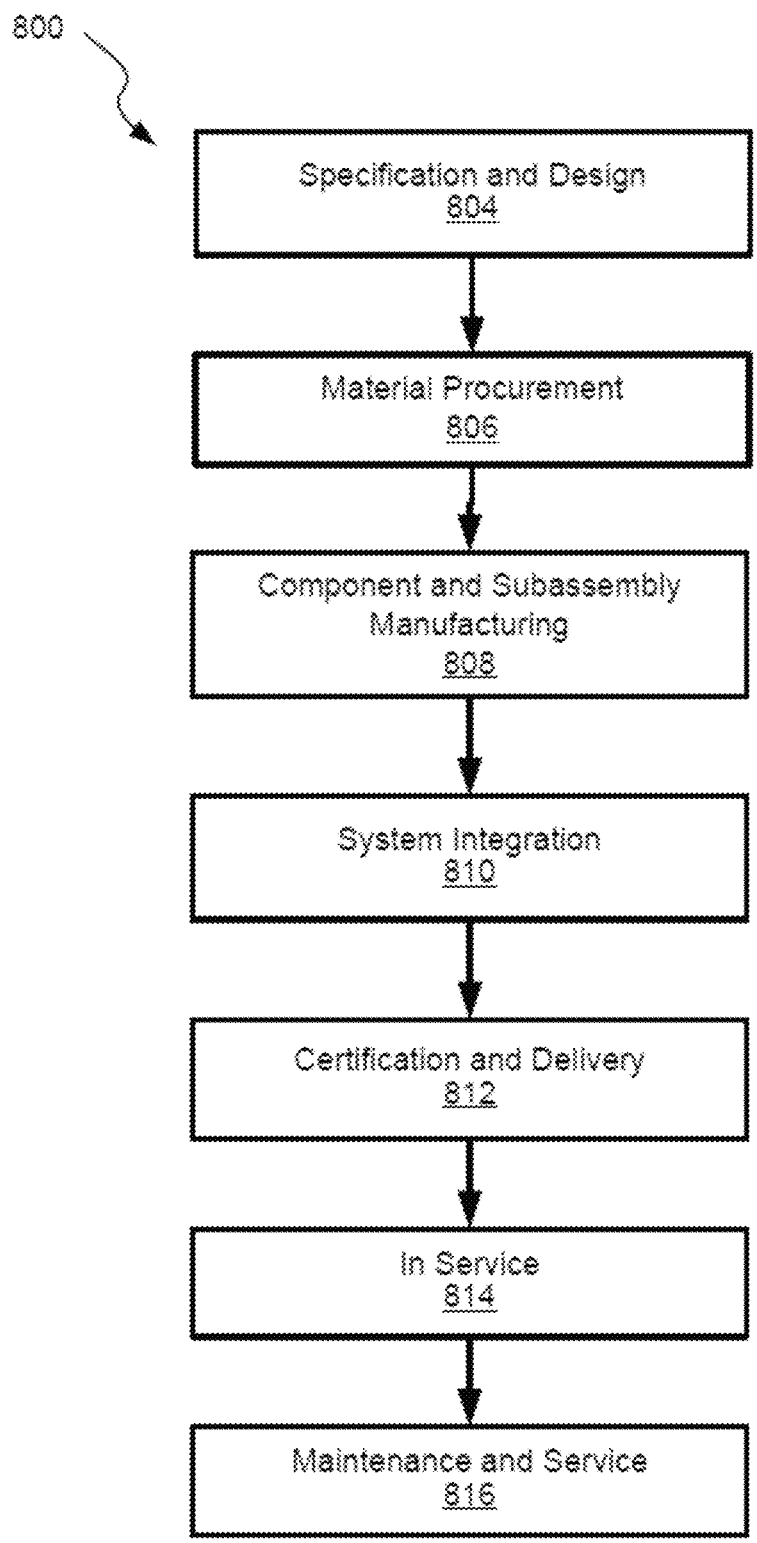

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a vehicle comprising a seating system, according to one or more examples of the present disclosure;

FIG. 2 is a block diagram of fastening hardware used in the seating system of the vehicle of FIG. 1, according to one or more examples of the present disclosure;

FIG. 3A is a schematic, top view of a primary pair of rails and a secondary pair of rails of the vehicle of FIG. 1, according to one or more examples of the present disclosure;

FIG. 3B is a schematic, top view of different seat assemblies supported by the primary pair of rails and the secondary pair of rails of FIG. 3A, according to one or more examples of the present disclosure;

FIG. 3C is a schematic, top view of different seat assemblies all supported by h pair of rails of FIG. 3A, according to one or more examples of the present disclosure;

FIG. 4A is a schematic, front view of a first seat assembly supported by the primary pair of rails of FIG. 3A according to one or more examples of the present disclosure;

FIG. 4B is a schematic, front view of a second seat assembly supported by the secondary pair of rails of FIG. 3A according to one or more examples of the present disclosure;

FIG. 5A is a schematic, top view of the primary pair of rails and the secondary pair of rails of the vehicle of FIG. 1, connected to floor beams by a plurality of struts, according to one or more examples of the present disclosure;

FIG. 5B is a schematic, front view of the secondary pair of rails of the vehicle of FIG. 1, connected to the floor beam by a plurality of struts, according to one or more examples of the present disclosure;

FIG. 5C-1 is a schematic, perspective view of a first strut of the plurality of struts of FIG. 5B, according to one or more examples of the present disclosure;

FIG. 5C-2 is a schematic, perspective view of a second strut of the plurality of struts of FIG. 5B, according to one or more examples of the present disclosure;

FIG. 5D is a schematic, back view of the secondary pair of rails, connected to the floor beam of the vehicle of FIG. 1 by the plurality of struts of FIG. 5A, according to one or more examples of the present disclosure;

FIG. 5E is a schematic, side view of one of the secondary pair of rails, connected to the floor beam of the vehicle of FIG. 1 by the first strut of the plurality of struts of FIG. 5B, according to one or more examples of the present disclosure;

FIG. 5F is a schematic, side view of one of the secondary pair of rails, connected to the floor beam of the vehicle of FIG. 1 by the second strut of the plurality of struts of FIG. 5B, according to one or more examples of the present disclosure;

FIG. 5G is a schematic, back view of the secondary pair of rails, struts, and doubler having fastener openings, according to one or more examples of the present disclosure;

FIG. 6 is a block diagram of a method for configuring the seating system of the vehicle of FIG. 1, according to one or more examples of the present disclosure;

FIG. 7 is a block diagram of aircraft production and service methodology; and FIG. 8 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 7 and 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7 and 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 3A, 3C, 4A, and 4B, seating system 1100 for vehicle 1000 is disclosed. Vehicle 1000 comprises floor beams 1020, which support floor panels 1060 that define floor surface 1062. Vehicle 1000 has virtual longitudinal plane 1012, perpendicular to floor surface 1062. Vehicle 1000 also has virtual longitudinal axis 1010, parallel to floor surface 1062 and lying in virtual longitudinal plane 1012. Seating system 1100 comprises primary pair of seat tracks 1300, secondary pair of seat tracks 1310, and first seat assembly 1200. One of secondary pair of seat tracks 1310 is positioned between seat tracks of primary pair of seat tracks 1300. First seat assembly 1200 comprises first seat support 1202 and first plurality of seats 1204, attached to first seat support 1202. First seat support 1202 is attached to primary pair of seat tracks 1300. The preceding subject matter of this paragraph characterizes example 1 of the present disclosure.

Two pairs of seat tracks, such as primary pair of seat tracks 1300 and secondary pair of seat tracks 1310, positioned at the same general location in vehicle 1000, allows changing seating configurations of vehicle 1000 with minimal efforts. In one example, each of primary pair of seat tracks 1300 and secondary pair of seat tracks 1310 is configured to support different types of seat assemblies, such as seat assemblies with different number of seats. In some examples, these types of seat assemblies are interchangeable. In some examples, one seat assembly is used, for instance, to increase the seating capacity of vehicle 1000, while another seat assembly is used, for instance, to increase the aisle space.

In one example, first seat assembly 1200 is attached to and supported by primary pair of seat tracks 1300 at one location in vehicle 1000. Primary pair of seat tracks 1300 is also configured for attaching to and supporting another seat assembly at another location in vehicle 1000, e.g., behind first seat assembly 1200. Secondary pair of seat tracks 1310 is also available at this other location and is configured for attaching to and supporting yet another seat assembly, different from the seat assembly that can be supported by primary pair of seat tracks 1300 at this other location. An operator of vehicle 1000 may choose which one of these seat assemblies should be used at this location. Because both primary pair of seat tracks 1300 and secondary pair of seat tracks 1310 are available, the seat assemblies can be changed with minimal efforts, e.g., without involving a manufacturer of vehicle 1000. In an example, a seat assembly is bolted or otherwise fastened to either primary pair of seat tracks 1300 or secondary pair of seat tracks 1310.

To avoid interference between primary pair of seat tracks 1300 and secondary pair of seat tracks 1310, in some examples, these pairs are shifted relative to each other, for example, in the direction perpendicular to virtual longitudinal plane 1012. In some examples, the degree of this shift is less than the track width of either primary pair of seat tracks 1300 or secondary pair of seat tracks 1310. As such, one of secondary pair of seat tracks 1310 is positioned between the seat tracks of primary pair of seat tracks 1300, and first seat assembly 1200. In some examples, the track widths of primary pair of seat tracks 1300 and secondary pair of seat tracks 1310 are identical.

As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

Referring generally to FIG. 1 and particularly to, e.g., FIGS. 3A and 4B, only one of secondary pair of seat tracks 1310 is positioned between seat tracks of primary pair of seat tracks 1300. The preceding subject matter of this paragraph characterizes example 2 of the present disclosure, wherein example 2 also includes the subject matter according to example 1, above.

Positioning one of secondary pair of seat tracks 1310 between the seat tracks of primary pair of seat tracks 1300 allows to avoid interference between secondary pair of seat tracks 1310 and primary pair of seat tracks 1300. Specifically, in some examples, secondary pair of seat tracks 1310 is shifted relative primary pair of seat tracks 1300 in the direction perpendicular to virtual longitudinal plane 1012. When the degree of shift is less than the width of primary pair of seat tracks 1300, only one of secondary pair of seat tracks 1310 is positioned between seat tracks of primary pair of seat tracks 1300. In some examples, the degree of shift is minimal to ensure that seat assemblies supported by primary pair of seat tracks 1300 and secondary pair of seat tracks 1310 can be aligned along virtual longitudinal axis 1010.

Positioning only one of secondary pair of seat tracks 1310 between the seat tracks of primary pair of seat tracks 1300 also allows using two pairs seat tracks with the same or similar track widths. In some cases, a certain minimum track width is needed to provide support to seat assemblies attached to primary pair of seat tracks 1300 and secondary pair of seat tracks 1310. In an example, each seat assembly includes multiple seats, forming a row that may extend in the direction perpendicular to the pair of tracks, supporting this assembly. Wider tracks are able to support more seats in such assemblies.

Referring generally to FIG. 1 and particularly to, e.g., FIG. 3A, only one of secondary pair of seat tracks 1310 is positioned between seat tracks of primary pair of seat tracks 1300 along the entire length of secondary pair of seat tracks 1310. The preceding subject matter of this paragraph characterizes example 3 of the present disclosure, wherein example 3 also includes the subject matter according to example 2, above.

Positioning one of secondary pair of seat tracks 1310 between the seat tracks of primary pair of seat tracks 1300 along the entire length of secondary pair of seat tracks 1310 allows to avoid interference between secondary pair of seat tracks 1310 and primary pair of seat tracks 1300 along that length. Furthermore, positioning one of secondary pair of seat tracks 1310 between seat tracks of primary pair of seat tracks 1300 along the entire length of secondary pair of seat tracks 1310 provides support to secondary pair of seat tracks 1310 along its entire length. This, in turn, allows using secondary pair of seat tracks 1310 that is shorter than would otherwise be necessarily, and shorter tracks have a lower weight. In an example, secondary pair of seat tracks 1310 is shorter without sacrificing support and load distribution characteristics of seating system 1100.

When installed, primary pair of seat tracks 1300 and secondary pair of seat tracks 1310 are both attached to the same set of floor beams 1020 in some examples. Primary pair of seat tracks 1300 are longer and are attached to a large number of floor beams 1020 than secondary pair of seat tracks 1310, in one example. The large number of floor beams 1020 delivers more uniform load distribution for primary pair of seat tracks 1300. In some examples, the same set of floor beams 1020, to which both primary pair of seat tracks 1300 and secondary pair of seat tracks 1310 are attached, provides load redistribution between primary pair of seat tracks 1300 and secondary pair of seat tracks 1310.

Referring generally to FIG. 1 and particularly to, e.g., FIG. 3A, only portion of one of primary pair of seat tracks 1300 is positioned between seat tracks of secondary pair of seat tracks 1310. The preceding subject matter of this paragraph characterizes example 4 of the present disclosure, wherein example 4 also includes the subject matter according to any one of examples 1 to 3, above.

In some examples, primary pair of seat tracks 1300 is longer than secondary pair of seat tracks 1310 such that only portion of one of primary pair of seat tracks 1300 is positioned between seat tracks of secondary pair of seat tracks 1310. As such, primary pair of seat tracks 1300 is configured to support a larger number of seat assemblies than secondary pair of seat tracks 1310. The portion of one of primary pair of seat tracks 1300, which is positioned between seat tracks of secondary pair of seat tracks 1310, corresponds to a location in vehicle 1000 where different seat assemblies can be supported by either primary pair of seat tracks 1300 or secondary pair of seat tracks 1310.

This orientation of primary pair of seat tracks 1300 and secondary pair of seat tracks 1310 allows to reconfigure vehicle 1000 or, more specifically, to change the seating configuration of vehicle 1000. The seating configuration can be changed where both primary pair of seat tracks 1300 and secondary pair of seat tracks 1310 are available, which is where the portion of one of primary pair of seat tracks 1300 is positioned between seat tracks of secondary pair of seat tracks 1310.

Referring generally to FIG. 1 and particularly to, e.g., FIG. 3A and FIG. 3B, the seat tracks of primary pair of seat tracks 1300 are longer than seat tracks of secondary pair of seat tracks 1310. The preceding subject matter of this paragraph characterizes example 5 of the present disclosure, wherein example 5 also includes the subject matter according to any one of examples 1 to 4, above.

In some examples, primary pair of seat tracks 1300 is longer than secondary pair of seat tracks 1310 and are configured to support a larger number of seat assemblies than secondary pair of seat tracks 1310. The portion of one of primary pair of seat tracks 1300, which is positioned between seat tracks of secondary pair of seat tracks 1310, corresponds to a location in vehicle 1000 where different seat assemblies can be supported by either primary pair of seat tracks 1300 or secondary pair of seat tracks 1310. However, in some examples, additional seat assemblies are supported by primary pair of seat tracks 1300 outside of this location.

This orientation of primary pair of seat tracks 1300 and secondary pair of seat tracks 1310 allows to reconfigure vehicle 1000 or, more specifically, to change the seating configuration of vehicle 1000. The seating configuration can be changed where both primary pair of seat tracks 1300 and secondary pair of seat tracks 1310 are available, which is where the portion of one of primary pair of seat tracks 1300 is positioned between seat tracks of secondary pair of seat tracks 1310. FIG. 3B illustrates first seat assembly 1200 attached to primary pair of seat tracks 1300, second seat assembly 1210 attached to secondary pair of seat tracks 1310, third seat assembly 1220 attached to primary pair of seat tracks 1300. In one example, second seat assembly 1210 is replaced by fourth seat assembly 1230, as shown in FIG. 3C. When installed, fourth seat assembly 1230 is attached to primary pair of seat tracks 1310. In this example, first seat assembly 1200 and third seat assembly 1220 cannot be attached to secondary pair of seat tracks 1310 because of the length of secondary pair of seat tracks 1310. However, primary pair of seat tracks 1300 is longer than secondary pair of seat tracks 1310 and first seat assembly 1200 and third seat assembly 1220 can be attached to primary pair of seat tracks 1300.

Referring generally to FIG. 1 and particularly to, e.g., FIG. 3A, neither one of secondary pair of seat tracks 1310 intersects either one of primary pair of seat tracks 1300. The preceding subject matter of this paragraph characterizes example 6 of the present disclosure, wherein example 6 also includes the subject matter according to any one of examples 1 to 5, above.

No intersections between primary pair of seat tracks 1300 and secondary pair of seat tracks 1310 indicate that secondary pair of seat tracks 1310 is attached to floor beams 1020 without interfering with primary pair of seat tracks 1300. Specifically, primary pair of seat tracks 1300 remains attached in its original position when secondary pair of seat tracks 1310 is installed. Having a combination of primary pair of seat tracks 1300 and secondary pair of seat tracks 1310 allows changing the seating configuration of vehicle 1000.

In some examples, primary pair of seat tracks 1300 and secondary pair of seat tracks 1310 are spaced apart from each other such as shown, e.g., in FIG. 3A, to avoid interference. This spacing eliminates possibility of intersections between primary pair of seat tracks 1300 and secondary pair of seat tracks 1310. Also, this spacing allows having tracks that are not parallel.

Referring generally to FIG. 1 and particularly to, e.g., FIG. 3A, the seat tracks of primary pair of seat tracks 1300 comprise first portions 1301 and second portions 1302, oblique relative to first portions 1301. First portions 1301 of the seat tracks of primary pair of seat tracks 1300 are parallel to seat tracks of secondary pair of seat tracks 1310. The preceding subject matter of this paragraph characterizes example 7 of the present disclosure, wherein example 7 also includes the subject matter according to any one of examples 1 to 6, above.

In some examples, first portions 1301 and second portions 1302 of primary pair of seat tracks 1300 are positioned in different parts of vehicle 1000. In some cases, these parts of the vehicle have different amounts of space available to accommodate seat assemblies. In some examples, first portions 1301 and second portions 1302 of primary pair of seat tracks 1300 are oblique to each other to accommodate these space differences in vehicle 1000.

In some examples, first portions 1301 and second portions 1302 of primary pair of seat tracks 1300 are used for attaching different types of seat assemblies, such as seat assemblies with different numbers of seats. Additionally, in some examples, secondary pair of seat tracks 1310 is used to attach another type of seat assemblies, which are also different from seat assemblies attached to primary pair of seat tracks 1300 (either first portions 1301 or second portions 1302 thereof). This capabilities of supporting different types of seats provides changeable seating arrangement in vehicle 1000.

In some examples, vehicle 1000 is an airplane, comprising a fuselage that becomes narrower in the tail portion. In some examples, primary pair of seat tracks 1300 extends through a larger portion of the fuselage than, e.g., secondary pair of seat tracks 1310. In some examples, first portions 1301 of primary pair of seat tracks 1300 are positioned away from the tail portion (e.g., in a wing portion), while second portions 1302 of primary pair of seat tracks 1300 are positioned in the tail portion. In some examples, second portions 1302 are oblique relative to first portions 1301 to accommodate the shape of the fuselage and smaller space in the tail portion of the fuselage. In an example, a seat assembly positioned in the tail portion and supported by second portions 1302 of primary pair of seat tracks 1300 has fewer seats than, for instance, a seat assembly, positioned away from the tail portion and supported by first portions 1301 of primary pair of seat tracks 1300. Adding secondary pair of seat tracks 1310 in the tail portions enables, in some examples, the addition of more seats that could otherwise be supported by second portion 1302 of primary pair of seat tracks 1300.

Referring generally to FIG. 1 and particularly to, e.g., FIG. 3A, the seat tracks of secondary pair of seat tracks 1310 are each parallel to virtual longitudinal axis 1010 of vehicle 1000. The preceding subject matter of this paragraph characterizes example 8 of the present disclosure, wherein example 8 also includes the subject matter according to example 7, above.

In some examples, arranging secondary pair of seat tracks 1310 parallel to virtual longitudinal axis 1010 of vehicle 1000 improves load-transfer characteristics of vehicle 1000, as acceleration and deceleration of vehicle 1000 typically occurs along virtual longitudinal axis 1010. Specifically, these loads are applied along the length of the seat tracks of secondary pair of seat tracks 1310, rather than transversely, which improves load distribution. Furthermore, such orientation of the seat tracks in secondary pair of seat tracks 1310 may simplify their attachment to floor beams 1020.

In some examples, floor beams 1020 are perpendicular to virtual longitudinal plane 1012. As such, when the seat tracks of secondary pair of seat tracks 1310 are each parallel to virtual longitudinal axis 1010, then these seat tracks are also perpendicular to floor beams 1020, simplifying the attachment of secondary pair of seat tracks 1310 to floor beams 1020. Furthermore, in some examples, such attachments are able to support larger loads than for example, when secondary pair of seat tracks 1310 are not perpendicular to floor beams 1020.

Referring generally to FIG. 1 and particularly to, e.g., FIG. 3A, second portions 1302 of the seat tracks of primary pair of seat tracks 1300 are not parallel to either one of secondary pair of seat tracks 1310. The preceding subject matter of this paragraph characterizes example 9 of the present disclosure, wherein example 9 also includes the subject matter according to example 7 or 8, above.

In some examples, second portions 1302 of both seat tracks of primary pair of seat tracks 1300 extend in a part of vehicle 1000 that has less space than other parts of vehicle 1000 (e.g., a part where at least some of secondary pair of seat tracks 1310 are positioned). To avoid interference with other components of vehicle 1000, in some examples the orientation of second portions 1302 of both seat tracks of primary pair of seat tracks 1300 is different than that of secondary pair of seat tracks 1310.

In some example, second portions 1302 of both seat tracks of primary pair of seat tracks 1300 is positioned in a tail part of a fuselage. This tail portion is narrower than a middle part, in some examples, and less space is available for seats and seat tracks. Second portions 1302 of both seat tracks of primary pair of seat tracks 1300 is not parallel (e.g., oblique) relative to either one of secondary pair of seat tracks 1310, in some examples. As show in FIG. 3A, second portions 1302 of both tracks of primary pair of seat tracks 1300 is angled toward virtual longitudinal axis 1010 of vehicle 1000 as second portions 1302 protrude toward the tail (and away from first portions 1301). Second portions 1302 of both seat tracks of primary pair of seat tracks 1300 protrudes further toward the tail than secondary pair of seat tracks 1310, in some examples.

Referring generally to FIG. 1 and particularly to, e.g., FIGS. 3B, 4A, and 4B, seating system 1100 further comprises second seat assembly 1210, comprising second seat support 1212 and second plurality of seats 1214, attached to second seat support 1212. Second seat support 1212 is attached to secondary pair of seat tracks 1310. The preceding subject matter of this paragraph characterizes example 10 of the present disclosure, wherein example 10 also includes the subject matter according to any one of examples 1 to 9, above.

Second seat assembly 1210 and first seat assembly 1200 are supported by different pairs of seat tracks. Specifically, first seat assembly 1200 is supported by primary pair of seat tracks 1300, while second seat assembly 1210 is supported by secondary pair of seat tracks 1310. In some examples, second seat assembly 1210 replaces another seat assembly which has been previously supported by primary pair of seat tracks 1300. This replacement is performed, for example, to increase the passenger capacity of vehicle 1000.

For example, second seat assembly 1210 is replaced back with the original seat assembly, which was replaced by second seat assembly 1210. As such, the seating configuration of vehicle 1000 is fully reversible. Primary pair of seat tracks 1300 is retained at all of its original locations, in some examples.

Referring generally to FIG. 1 and particularly to, e.g., FIGS. 3B, 4A, and 4B, first seat support 1202 is geometrically different from second seat support 1212. The preceding subject matter of this paragraph characterizes example 11 of the present disclosure, wherein example 11 also includes the subject matter according to example 10, above.

The geometric difference between first seat support 1202 and second seat support 1212 allows aligning first plurality of seats 1204 with second plurality of seats 1214 relative to virtual longitudinal plane 1012 even when seat tracks supporting these seat assemblies are offset. In some examples, the track offset is used to avoid interference between primary pair of seat tracks 1300 and secondary pair of seat tracks 1310. However, the alignment or a different offset of first plurality of seats 1204 with second plurality of seats 1214 allows to have a straight aisle with a constant width.

Specifically, first seat assembly 1200 comprises first seat support 1202 attached to primary pair of seat tracks 1300, while second seat assembly 1210 comprises second seat support 1212 attached to secondary pair of seat tracks 1310. As shown in FIG. 3A, secondary pair of seat tracks 1310 is offset toward virtual longitudinal plane 1012 relative to primary pair of seat tracks 1300 or, at least, relative to first portions 1301 of primary pair of seat tracks 1300. As shown in FIG. 3B, each seat in first plurality of seats 1204 of first seat assembly 1200 is generally aligned with one seat in second plurality of seats 1214 of second seat assembly 1210 along virtual longitudinal axis 1010.

Referring generally to FIG. 1 and particularly to, e.g., FIGS. 3B, 4A, and 4B, first plurality of seats 1204 of first seat assembly 1200 is aligned with second plurality of seats 1214 of second seat assembly 1210 along virtual longitudinal axis 1010 of vehicle 1000. The preceding subject matter of this paragraph characterizes example 12 of the present disclosure, wherein example 12 also includes the subject matter according to example 10 or 11, above.

Aligning first plurality of seats 1204 of first seat assembly 1200 with second plurality of seats 1214 of second seat assembly 1210 along virtual longitudinal axis 1010 allows having a straight aisle extending along virtual longitudinal axis 1010 of vehicle 1000 as, for example, shown in FIG. 3B. Furthermore, passengers in second plurality of seats 1214 have available to them the various convenience features of first plurality of seats 1204, such as foldable trays, video displays, various types of holders, and the like.

As shown in FIG. 3B, each seat in first plurality of seats 1204 of first seat assembly 1200 is generally aligned with one seat in second plurality of seats 1214 of second seat assembly 1210 along virtual longitudinal axis 1010. In this example, the number of seats in first plurality of seats 1204 and the number of seats in second plurality of seats 1214 is the same. Furthermore, the seats (e.g., type, size) in first plurality of seats 1204 and in second plurality of seats 1214 are identical. When the seat numbers are different or different types of seats are used in first plurality of seats 1204 and in second plurality of seats 1214, midpoints of first plurality of seats 1204 and second plurality of seats 1214 are aligned along virtual longitudinal axis 1010 of vehicle 1000, in some examples.

Referring generally to FIG. 1 and particularly to, e.g., FIGS. 3B, 4A, and 4B, first plurality of seats 1204 of first seat assembly 1200 comprises first inboard seat 1205, positioned closer to virtual longitudinal plane 1012 of vehicle 1000 than all other seats in first plurality of seats 1204. Second plurality of seats 1214 of second seat assembly 1210 comprises second inboard seat 1215, positioned closer to virtual longitudinal plane 1012 than all other seats in second plurality of seats 1214. First shortest distance $D_a$ between first inboard seat 1205 and virtual longitudinal plane 1012 is identical to second shortest distance $D_b$ between second inboard seat 1215 and virtual longitudinal plane 1012. The preceding subject matter of this paragraph characterizes example 13 of the present disclosure, wherein example 13 also includes the subject matter according to any one of examples 10 to 12, above.

Having the same shortest distance between inboard seats of different rows of seats and virtual longitudinal plane 1012 provides for a straight aisle, defined at least in part by first inboard seat 1205 and second inboard seat 1215.

In this example, the aisle extends along virtual longitudinal plane 1012. The straight aisle allows passengers to move and/or objects to be moved within vehicle 1000 without extensive turning and bumping into seats. Furthermore, the straight aisle is narrower than, for example, an aisle that non-linear. Narrower aisles allow to put more seats into vehicles 1000, thereby increasing the passenger capacity of vehicle 1000.

Referring generally to FIG. 1 and particularly to, e.g., FIGS. 3B, 4A, and 4B, seats in first plurality of seats 1204 of first seat assembly 1200 are arranged along first row-axis 1201. Seats in second plurality of seats 1214 of second seat assembly 1210 are arranged along second row-axis 1211, parallel to first row-axis 1201. The preceding subject matter of this paragraph characterizes example 14 of the present disclosure, wherein example 14 also includes the subject matter according to any one of examples 10 to 13, above.

When first plurality of seats 1204 is parallel to second plurality of seats 1214 or, more specifically, when second row-axis 1211 is parallel to first row-axis 1201, the spacing between first plurality of seats 1204 and second plurality of seats 1214 is constant, in some examples.

This alignment and constant spacing allows passengers to easily access second plurality of seats 1214, specifically the seats in second plurality of seats 1214 that are further away from virtual longitudinal plane 1012. This constant spacing aspect also enables passengers, seated in second plurality of seats 1214, to use the various features of the back sides of first plurality of seats 1204, such as foldable trays, displays, and the like. In some examples, the back sides of first plurality of seats 1204 are utilized as safety features for passengers, seated in second plurality of seats 1214. The spacing between first plurality of seats 1204 and second plurality of seats 1214 is defined by pairs of seats, each pair formed by one from first plurality of seats 1204 and a corresponding one from second plurality of seats 1214.

Referring generally to FIG. 1 and particularly to, e.g., FIG. 3B, both first row-axis 1201 and second row-axis 1211 are perpendicular to virtual longitudinal plane 1012 of vehicle 1000. The preceding subject matter of this paragraph characterizes example 15 of the present disclosure, wherein example 15 also includes the subject matter according to example 14, above.

When first row-axis 1201 and second row-axis 1211 are perpendicular to virtual longitudinal plane 1012, passengers seated in first plurality of seats 1204 and second plurality of seats 1214 face in the direction, parallel to virtual longitudinal axis 1010. Considering that most deceleration and acceleration of vehicle 1000 occurs along virtual longitudinal axis 1010, passenger comfort is improved with such orientations of first plurality of seats 1204 and second plurality of seats 1214.

For example, during deceleration of vehicle 1000, the back sides of first plurality of seats 1204 are utilized as safety features for passengers seated in second plurality of seats 1214. Similarly, passengers are generally more comfortable when acceleration of vehicle 1000 occurs in the direction that is perpendicular to back supports (and head rests) of their seats.

Referring generally to FIG. 1 and particularly to, e.g., FIGS. 3B, 4A, and 4B, first plurality of seats 1204 of first seat assembly 1200 and second plurality of seats 1214 of second seat assembly 1210 have equal numbers of seats. The preceding subject matter of this paragraph characterizes example 16 of the present disclosure, wherein example 16 also includes the subject matter according to any one of examples 10 to 14, above.

The same number of seats in first plurality of seats 1204 and second plurality of seats 1214, shown in FIG. 3B, is used to maximize the overall seating capacity of vehicle, in comparison, for example, to a seat arrangement, shown in FIG. 3C. Furthermore, back supports of first plurality of seats 1204 are used as safety features by passengers in second plurality of seats 1214 during, for example, sudden deceleration of vehicle 1000. The same number of seats also enables passengers, seated in second plurality of seats 1214, to use the back sides of first plurality of seats 1204 for various features such as tables-tops, displays, and the like.

Specifically, each seat in second plurality of seats 1214 has a corresponding seat in first plurality of seats 1204. In some examples, the back side of this seat in first plurality of seats 1204 is used to support these various features and utilized by a passenger in the seat of second plurality of seats 1214.

Referring generally to FIG. 1 and particularly to, e.g., FIGS. 3B, 4A, and 4B, each seat in first plurality of seats 1204 of first seat assembly 1200 is identical to any seat in second plurality of seats 1214 of second seat assembly 1210. The preceding subject matter of this paragraph characterizes example 17 of the present disclosure, wherein example 17 also includes the subject matter according to any one of examples 10 to 16, above.

Identical seats occupy the same amount of space and, therefore, can be easily aligned in vehicle 1000. Furthermore, seat assemblies having identical seats is easier to manufacture, in some examples.

For example, each seat in second plurality of seats 1214 has a corresponding seat in first plurality of seats 1204, and this pair of seats is aligned. The alignment provides various comfort features for a passenger in a seat of second plurality of seats 1214.

Referring generally to FIG. 1 and particularly to, FIG. 3B, seating system 1100 further comprises third seat assembly 1220, attached to primary pair of seat tracks 1300. At least portion of second seat assembly 1210 is positioned between first seat assembly 1200 and third seat assembly 1220. The preceding subject matter of this paragraph characterizes example 18 of the present disclosure, wherein example 18 also includes the subject matter according to any one of examples 10 to 17, above.

Second seat assembly 1210 is positioned between first seat assembly 1200 and third seat assembly 1220, but second seat assembly 1210 is attached to a different pair of tracks. Specifically, first seat assembly 1200 and third seat assembly 1220 are both attached to primary pair of seat tracks 1300. Second seat assembly 1210 is attached to secondary pair of seat tracks 1310 even though a portion of primary pair of seat tracks 1300 extends under second seat assembly 1210. This portion of primary pair of seat tracks 1300 is not used for attachment of second seat assembly 1210 in at least one seat configuration. However, in another seat configuration, this portion of primary pair of seat tracks 1300 is used by another seat assembly, which would replace second seat assembly 1210.

As shown in FIG. 3B, third seat assembly 1220 has a smaller number of seats than second seat assembly 1210, in some examples. In these examples, third seat assembly 1220 does not extend the entire length of second seat assembly 210, where the length of the second seat assembly is defined in the direction perpendicular to virtual longitudinal plane 1012. However, at least a portion of second seat assembly 1210 is positioned between first seat assembly 1200 and third seat assembly 1220. Another portion of second seat assembly 1210 extends outside the area between first seat assembly 1200 and third seat assembly 1220, in some examples.

Referring generally to FIG. 1 and particularly to, e.g., FIG. 3B, third seat assembly 1220 comprises third plurality of seats 1224. Seats in third plurality of seats 1224 are arranged along third row-axis 1221, oblique to virtual longitudinal plane 1012 of vehicle 1000. The preceding subject matter of this paragraph characterizes example 19 of the present disclosure, wherein example 19 also includes the subject matter according to example 18, above.

The oblique orientation, relative to virtual longitudinal plane 1012 of vehicle 1000, enables third seat assembly 1220 to be positioned in a part of vehicle 1000 that has less space than another part, where first seat assembly 1200 or second seat assembly 1210 is positioned.

For example, third seat assembly 1220 is positioned in a tail part of an aircraft that is narrower than a middle part of the aircraft. The oblique orientation allows to position third seat assembly 1220 in that part without narrowing the aisle. In fact, the oblique orientation is used for making the aisle wider, in some examples. The change in the orientation angle (e.g., from perpendicular to oblique to virtual longitudinal plane 1012) corresponds to the change in the number of seats, in some examples. As shown in FIG. 3B, third plurality of seats 1224 has two seats, while second plurality of seats 1214 has three seats.

Referring generally to FIG. 1 and particularly to, e.g., FIG. 3B, first plurality of seats 1204 of first seat assembly 1200 and third plurality of seats 1224 of third seat assembly 1220 have different numbers of seats. The preceding subject matter of this paragraph characterizes example 20 of the present disclosure, wherein example 20 also includes the subject matter according to example 19, above.

In some examples, type of seats, space available for the seats, orientation of the seats, and other factors determine the number of seats in each assembly. In some examples, assemblies having different number of seats are supported by the same tracks, e.g., by primary pair of seat tracks 1300.

In some examples, third seat assembly 1220 is positioned in a part of vehicle 1000 that has less space than the part where first seat assembly 1200 is positioned. In these examples, third plurality of seats 1224 of third seat assembly 1220 has have fewer seats than first plurality of seats 1204 of first seat assembly 1200 as, for example, shown in FIG. 3B. Both third seat assembly 1220 and first seat assembly 1200 are attached to and supported by primary pair of seat tracks 1300.

Referring generally to FIG. 1 and particularly to, e.g., FIG. 3C, seating system 1100 further comprises third seat assembly 1220 and fourth seat assembly 1230, both attached to primary pair of seat tracks 1300. At least a portion of fourth seat assembly 1230 is positioned between first seat assembly 1200 and third seat assembly 1220. The preceding subject matter of this paragraph characterizes example 21 of the present disclosure, wherein example 21 also includes the subject matter according to any one of examples 1 to 17, above.

In some examples, fourth seat assembly 1230 is interchangeable with second seat assembly 1210 in the space between first seat assembly 1200 and third seat assembly 1220. In these examples, the ability to change seat assemblies is used to increase seating capacity, increase aisle space, and for other purposes.

For example, the seating capacity can be reduced by replacing second seat assembly 1210 with fourth seat assembly 1230 as schematically shown in FIGS. 3B and 3C. Furthermore, different seat configurations utilize different seat tracks, but both primary pair of seat tracks 1300 and secondary pair of seat tracks 1310 are available in that location. Specifically, when second seat assembly 1210 is installed, second seat assembly 1210 is attached to secondary pair of seat tracks 1310. However, when fourth seat assembly 1230 is installed, fourth seat assembly 1230 is attached to primary pair of seat tracks 1300.

Referring generally to FIG. 1 and particularly to, e.g., FIG. 3C, fourth seat assembly 1230 comprises fourth plurality of seats 1234. Seats in fourth plurality of seats 1234 are arranged along fourth row-axis 1231, oblique to virtual longitudinal plane 1012 of vehicle 1000. The preceding subject matter of this paragraph characterizes example 22 of the present disclosure, wherein example 22 also includes the subject matter according to example 21, above.

The oblique orientation, relative to virtual longitudinal plane 1012 of vehicle 1000, allows to position fourth seat assembly 1230 in a part of vehicle 1000 that has less space than another part, for example, a part where first seat assembly 1200 or second seat assembly 1210 are positioned. Furthermore, in some examples, fourth plurality of seats 1234 is oblique relative to virtual longitudinal plane 1012 so that fourth plurality of seats 1234 is parallel to third plurality of seats 1224. This ensures that the space between fourth plurality of seats 1234 and third plurality of seats 1224 is uniform and allows passengers to access third plurality of seats 1224 with minimal effort.

For example, fourth seat assembly 1230 is positioned in a tail part of an aircraft that is narrower than a middle part of the aircraft. The oblique orientation allows to position fourth seat assembly 1230 in that part without narrowing the aisle. In these examples, the oblique orientation is used for making the aisle wider. Furthermore, the relative arrangement of third plurality of seats 1224 and fourth plurality of seats 1234 enables passengers, seated in third plurality of seats 1224, to use the back side of fourth plurality of seats 1234 for access to various features, such as foldable trays, displays, and the like.

Referring generally to FIG. 1 and particularly to, e.g., FIG. 3C, first plurality seats 1204 of first seat assembly 1200 and fourth plurality of seats 1234 of fourth seat assembly 1230 have different numbers of seats. The preceding subject matter of this paragraph characterizes example 23 of the present disclosure, wherein example 23 also includes the subject matter according to example 22, above.

The different numbers of seats in fourth plurality of seats 1234 allows positioning fourth seat assembly 1230 in a location of vehicle 1000 that has different amount of space than, for example, a location where first seat assembly 1200 is positioned. Primary pair of seat tracks 1300 extend through both of these locations and support both first seat assembly 1200 and fourth seat assembly 1230.

In one example, fourth seat assembly 1230 is positioned in a part of vehicle 1000 that has less space than the part where first seat assembly 1200 is positioned. In this example, fourth plurality of seats 1234 of fourth seat assembly 1230 has fewer seats than first plurality of seats 1204 of first seat assembly 1200 as shown, e.g., in FIG. 3B. Fewer seats than the number of seats in first plurality of seats 1204 ensures that a minimum width of an aisle is maintained.

Referring generally to FIG. 1 and particularly to, e.g., FIG. 3C, third seat assembly 1220 comprises third plurality of seats 1224. Third plurality of seats 1224 and fourth plurality of seats 1234 of fourth seat assembly 1230 have equal numbers of seats. The preceding subject matter of this paragraph characterizes example 24 of the present disclosure, wherein example 24 also includes the subject matter according to example 22 or 23, above.

The same number of seats in third plurality of seats 1224 and fourth plurality of seats 1234 is used, for example, when the same or similar amount of space is available for corresponding seat assemblies. Furthermore, the same number of seats in third plurality of seats 1224 and fourth plurality of seats 1234 allows passengers, seated in the seats of third plurality of seats 1224, to utilize the back sides of the seats in fourth plurality of seats 1234 for access to various convenience features, especially when individual seats in third plurality of seats 1224 and fourth plurality of seats 1234 are aligned.

In some examples, the back sides of the seats in fourth plurality of seats 1234, which are positioned in front of third plurality of seats 1224 include foldable trays, displays, and/or other like features, for use by passengers in the seats of third plurality of seats 1224. In these examples, each seat in third plurality of seats 1224 has a corresponding seat in fourth plurality of seats 1234 and the backside of this seat in fourth plurality of seats 1234 is used to support these various features.

Referring generally to FIG. 1 and particularly to, e.g., FIG. 7, vehicle 1000 is one of an aircraft, a watercraft, or land vehicle. The preceding subject matter of this paragraph characterizes example 25 of the present disclosure, wherein example 25 also includes the subject matter according to any one of examples 1 to 24, above.

An aircraft, a watercraft, or an automobile are all examples of vehicle 1000 carrying many passengers. In some examples, changing seating configurations in such types of vehicles is used increase or decrease seating capacity, changing aisle width, and other purposes. Furthermore, seating system 1100, described herein, can be easily reconfigured by an operator of vehicle 1000 without, for example, involving the manufacturer.

Different seat assemblies in vehicle 1000 are attached to and supported by various seat tracks. Using secondary pair of seat tracks 1310 in addition to primary pair of seat tracks 1300 allows using different seat configurations, to maximize passenger capacity, providing additional isle space, and the like.

Referring generally to FIG. 1 and particularly to, e.g., FIGS. 3B and 4B, seating-system kit 1500 for vehicle 1000 is disclosed. Vehicle 1000 comprises floor beams 1020, primary pair of seat tracks 1300, attached to floor beams 1020, and first seat assembly 1200. First seat assembly 1200 comprises first seat support 1202 and first plurality of seats 1204, attached to first seat support 1202. First seat support 1202 is attached to primary pair of seat tracks 1300. Floor beams 1020 support floor panels 1060 that define floor surface 1062. Vehicle 1000 has virtual longitudinal plane 1012, perpendicular to floor surface 1062. Vehicle 1000 also has virtual longitudinal axis 1010, parallel to floor surface 1062 and lying in virtual longitudinal plane 1012. Seating-system kit 1500 comprises secondary pair of seat tracks 1310 and second seat assembly 1210. Second seat assembly 1210 comprises second seat support 1212 and second plurality of seats 1214, attached to second seat support 1212. Second seat support 1212 is configured to be attached to secondary pair of seat tracks 1310. The preceding subject matter of this paragraph characterizes example 26 of the present disclosure.

Seating-system kit 1500 allows new seating configurations in vehicle 1000. In some examples, a seat assembly, having a fewer number of seats, is replaced with second seat assembly 1210, having a larger number of seats, thereby increasing the overall seating capacity of vehicle 1000. Adding secondary pair of seat tracks 1310 also allows to reconfigure vehicle 1000 without disturbing primary pair of seat tracks 1300 positioned on vehicle 1000. Furthermore, having both primary pair of seat tracks 1300 and secondary pair of seat tracks 1310 allows for quick reconfiguration of vehicle 1000. Primary pair of seat tracks 1300 and secondary pair of seat tracks 1310 are configured and used to support different types of seat assemblies (e.g., seat assemblies with different number of seats). These types of seat assemblies are interchangeable in the same general location. One seat assembly is used, for example, to increase the seating capacity of vehicle 1000, while another seat assembly is used, for example, to increase aisle space.

In some examples, second seat assembly 1210 is used to replace a different type of seat assembly in vehicle 1000, e.g., a seat assembly with fewer seats. However, second seat assembly 1210 is configured to be attached and supported by secondary pair of seat tracks 1310, while the replaced seat assembly has been previously attached and supported by primary pair of seat tracks 1310.

In some examples, secondary pair of seat tracks 1310 and second seat assembly 1210 are supplied as seating-system kit 1500 to an operator of vehicle 1000 to enable the operator to change the seating configuration of vehicle 1000. Second seat assembly 1210 is added to primary pair of seat tracks 1300, rather than replacing primary pair of seat tracks 1300. As such either second seat assembly 1210 or primary pair of seat tracks 1300 is available for supporting one or more seat assemblies at a certain location in vehicle 1000. In some examples, primary pair of seat tracks 1300 extends beyond this location and be used for supporting other seat assemblies.

Referring generally to FIG. 1 and particularly to, e.g., FIG. 3A, secondary pair of seat tracks 1310 is configured to be attached to floor beams 1020 of vehicle 1000 such that one seat track of secondary pair of seat tracks 1310 is positioned between seat tracks of primary pair of seat tracks 1300. The preceding subject matter of this paragraph characterizes example 27 of the present disclosure, wherein example 27 also includes the subject matter according to example 26, above.

Positioning one of secondary pair of seat tracks 1310 between seat tracks of primary pair of seat tracks 1300 enables the tracks of both pairs to avoid interference with each other. Secondary pair of seat tracks 1310 is configured to attach to floor beams 1020, which also support primary pair of seat tracks 1300. Specifically, in some examples, secondary pair of seat tracks 1310 is shifted relative primary pair of seat tracks 1300 in the direction perpendicular to virtual longitudinal plane 1012. When the degree of shift is less than the width of primary pair of seat tracks 1300, only one of secondary pair of seat tracks 1310 is positioned between seat tracks of primary pair of seat tracks 1300. In some examples, the degree of shift is minimal to ensure that seat assemblies supported by primary pair of seat tracks 1300 and secondary pair of seat tracks 1310 are aligned along virtual longitudinal axis 1010.

Positioning only one of secondary pair of seat tracks 1310 between the seat tracks of primary pair of seat tracks 1300 also allows using seat tracks with similar track widths. A certain minimum track width is used, in some examples, to provide support to seat assemblies, attached to primary pair of seat tracks 1300 and secondary pair of seat tracks 1310. In some examples, the track widths of primary pair of seat tracks 1300 and secondary pair of seat tracks 1310 are constant and are substantially the same (e.g., varying by less than 10% or even varying by less than 5%). This feature also enables the combination of non-linear and straight tracks without interference. For example, FIG. 3A illustrates primary pair of seat tracks 1300 having first portions 1301 and second portions 1302, oblique to first portions 1301. Secondary pair of seat tracks 1310 are straight.

Referring generally to FIG. 1 and particularly to, e.g., FIGS. 3A and 4A, only one of secondary pair of seat tracks 1310 is configured to be positioned between seat tracks of primary pair of seat tracks 1300. The preceding subject matter of this paragraph characterizes example 28 of the present disclosure, wherein example 28 also includes the subject matter according to example 27, above.

Positioning one of secondary pair of seat tracks 1310 between the seat tracks of primary pair of seat tracks 1300 allows to avoid interference between secondary pair of seat tracks 1310 and primary pair of seat tracks 1300. Specifically, secondary pair of seat tracks 1310 is shifted relative primary pair of seat tracks 1300 in the direction, perpendicular to virtual longitudinal plane 1012. When the degree of shift is less than the width of primary pair of seat tracks 1300, only one of secondary pair of seat tracks 1310 is positioned between seat tracks of primary pair of seat tracks 1300. In some examples, the degree of shift is minimal to ensure that seat assemblies supported by primary pair of seat tracks 1300 and secondary pair of seat tracks 1310 are aligned along virtual longitudinal axis 1010.

Positioning only one of secondary pair of seat tracks 1310 between the seat tracks of primary pair of seat tracks 1300 also enables the use of seat tracks with similar track widths. A certain minimum track width is used, in some examples, to provide support to seat assemblies attached to primary pair of seat tracks 1300 and secondary pair of seat tracks 1310, particularly in when vehicle 1000 is moving. In some examples, the track widths of primary pair of seat tracks 1300 and secondary pair of seat tracks 1310 are constant and are substantially the same (e.g., varying by less than 10% or even varying by less than 5%). This features also allows combining bend and straight tracks without interference. For example, FIG. 3A illustrates primary pair of seat tracks 1300 having first portions 1301 and second portions 1302 oblique to first portions 1301. Secondary pair of seat tracks 1310 are straight.

Referring generally to FIG. 1 and particularly to, e.g., FIGS. 3A and 4B, only one of secondary pair of seat tracks 1310 is configured to be positioned between seat tracks of primary pair of seat tracks 1300 along an entire length of secondary pair of seat tracks 1310. The preceding subject matter of this paragraph characterizes example 29 of the present disclosure, wherein example 29 also includes the subject matter according to example 27 or 28, above.

Positioning one of secondary pair of seat tracks 1310 between the seat tracks of primary pair of seat tracks 1300 along the entire length of secondary pair of seat tracks 1310 avoids interference between secondary pair of seat tracks 1310 and primary pair of seat tracks 1300 along that length. Furthermore, positioning one of secondary pair of seat tracks 1310 between seat tracks of primary pair of seat tracks 1300 along the entire length of secondary pair of seat tracks 1310 provides support to secondary pair of seat tracks 1310 along its entire length and allows using secondary pair of seat tracks 1310 that is shorter and, therefore, have lower weight without sacrificing support and load distribution characteristics of seating system 1100.

When installed, primary pair of seat tracks 1300 and secondary pair of seat tracks 1310 are both attached to the same set of floor beams 1020. In some examples, primary pair of seat tracks 1300 is longer and is attached to a larger number of floor beams 1020 (than secondary pair of seat tracks 1310), thereby allowing more uniform load distribution. The same set of floor beams 1020, to which both primary pair of seat tracks 1300 and secondary pair of seat tracks 1310 are attached allows for load redistribution between primary pair of seat racks 1300 and secondary pair of seat tracks 1310.

Referring generally to FIG. 1 and particularly to, e.g., FIG. 3A, only a portion of one of primary pair of seat tracks 1300 is configured to be positioned between seat tracks of secondary pair of seat tracks 1310. The preceding subject matter of this paragraph characterizes example 30 of the present disclosure, wherein example 30 also includes the subject matter according to any one of examples 27 to 29, above.

In some examples, primary pair of seat tracks 1300 is longer than secondary pair of seat tracks 1310 such that only portion of one of primary pair of seat tracks 1300 is positioned between seat tracks of secondary pair of seat tracks 1310. As such, primary pair of seat tracks 1300 is configured to support a larger number of seat assemblies than secondary pair of seat tracks 1310. The portion of one of primary pair of seat tracks 1300, which is positioned between seat tracks of secondary pair of seat tracks 1310, corresponds to a location in vehicle 1000 where different seat assemblies can be supported by either primary pair of seat tracks 1300 or secondary pair of seat tracks 1310.

This orientation of primary pair of seat tracks 1300 and secondary pair of seat tracks 1310 allows to reconfigure vehicle 1000 or, more specifically, to change the seating configuration of vehicle 1000. The seating configuration can be changed where both primary pair of seat tracks 1300 and secondary pair of seat tracks 1310 are available, which is where the portion of one of primary pair of seat tracks 1300 is positioned between seat tracks of secondary pair of seat tracks 1310.

Referring generally to FIG. 1 and particularly to, e.g., FIG. 3A, secondary pair of seat tracks 1310 is configured to be attached to floor beams 1020 of vehicle 1000 such that each of secondary pair of seat tracks 1310 is parallel to virtual longitudinal axis 1010 of vehicle 1000. The preceding subject matter of this paragraph characterizes example 31 of the present disclosure, wherein example 31 also includes the subject matter according to any one of examples 26 to 30, above.

Seat tracks being parallel to virtual longitudinal axis 1010 of vehicle 1000 improves the comfort aspect of vehicle 1000, in some examples, as acceleration and deceleration of vehicle 1000 typically occurs along virtual longitudinal axis 1010. Specifically, the loads are applied along the length of the seat tracks of secondary pair of seat tracks 1310, rather than across these seat tracks. As such, secondary pair of seat tracks 1310 is configured to support larger loads in the longitudinal direction. Furthermore, such orientation of the seat tracks in secondary pair of seat tracks 1310 simplifies their attachment to floor beams 1020, in some examples.

In some examples, floor beams 1020 are perpendicular to virtual longitudinal plane 1012. As such, when the seat tracks of secondary pair of seat tracks 1310 are each parallel to virtual longitudinal axis 1010, then these seat tracks are also perpendicular to floor beams 1020, simplifying the attachment of secondary pair of seat tracks 1310 to floor beams 1020. In some examples, such attachment also supports larger loads, e.g., when secondary pair of seat tracks 1310 are not perpendicular to floor beams 1020.

Referring generally to FIG. 1 and particularly to, e.g., FIG. 3A, each seat track of secondary pair of seat tracks 1310 is straight. The preceding subject matter of this paragraph characterizes example 32 of the present disclosure, wherein example 32 also includes the subject matter according to any one of examples 26 to 31, above.

In some examples, straight tracks are easier to fabricate, transport, and install on vehicle 1000 than, for example, tracks with a bend. Furthermore, straight tracks are able support larger loads particularly in the direction, parallel to the tracks.

In some examples, secondary pair of seat tracks 1310 are shorter than primary pair of seat tracks 1300 and are straight even when positioned in a narrowing portion of vehicle 1000 or between primary pair of seat tracks 1300 than have oblique portions.

Referring generally to FIG. 1 and particularly to, e.g., FIG. 3A, seat tracks of secondary pair of seat tracks 1310 have identical lengths. The preceding subject matter of this paragraph characterizes example 33 of the present disclosure, wherein example 33 also includes the subject matter according to any one of examples 26 to 32, above.

The identical length of the seat tracks of secondary pair of seat tracks 1310 enables interchangeable use of these tracks. Secondary pair of seat tracks 1310, having identical lengths, are easier to fabricate, transport, and install on vehicle 1000.

In some examples, the length of seat tracks of secondary pair of seat tracks 1310 spans multiple floor beams 1020, spreading the load exerted onto secondary pair of seat tracks 1310. Both seat tracks of secondary pair of seat tracks 1310 are attached to the same set of floor beams 1020 to ensure even support to second seat assembly 1210, supported by secondary pair of seat tracks 1310.

Referring generally to FIG. 1 and particularly to, e.g., FIG. 3A, each of secondary pair of seat tracks 1310 is shorter than each of primary pair of seat tracks 1300. The preceding subject matter of this paragraph characterizes example 34 of the present disclosure, wherein example 34 also includes the subject matter according to any one of examples 26 to 33, above.

In some examples, the length of seat tracks is kept to a minimum to reduce the overall weight of vehicle 1000. Since secondary pair of seat tracks 1310 is used to support fewer seat assemblies than primary pair of seat tracks 1300, the length of secondary pair of seat tracks 1310 is less than the length of primary pair of seat tracks 1300, in some examples.

In some examples, primary pair of seat tracks 1300 are used to support seat assemblies outside of area of secondary pair of seat tracks 1310. In an example shown in FIG. 3B, primary pair of seat tracks 1300 supports first seat assembly 1200 and third seat assembly 1220, while secondary pair of seat tracks 1310 supports second seat assembly 1210, positioned between first seat assembly 1200 and third seat assembly 1220. The continuity of primary pair of seat tracks 1300 is used to provide different seat configuration of vehicle 1000, in some examples. As shown in FIG. 3C, second seat assembly 1210 is replaced with fourth seat assembly 1230, which is supported by primary pair of seat tracks 1300.

Referring generally to FIG. 1 and particularly to, e.g., FIGS. 4A, 4B, and 5B, each seat track of secondary pair of seat tracks 1310 and each seat track of primary pair of seat tracks 1300 have identical widths. The preceding subject matter of this paragraph characterizes example 35 of the present disclosure, wherein example 35 also includes the subject matter according to any one of examples 26 to 34, above.

In some examples, the seat tracks of secondary pair of seat tracks 1310 and of primary pair of seat tracks 1300 are substantially the same or, more specifically, have each of these seat tracks identical widths. This similarity allows using similar mounting points for seat supports, using similar hardware for attaching these seat tracks to floor beams, and simplifying fabrication of these seat tracks.

The widths of each seat track of secondary pair of seat tracks 1310 and each seat track of primary pair of seat tracks 1300 are measured in the directions perpendicular to their respective longest dimensions. In some examples, the cross-sections of each seat track of secondary pair of seat tracks 1310 and each seat track of primary pair of seat tracks 1300 is identical in these directions. An example of the cross-section of one seat track of secondary pair of seat tracks 1310 is shown in FIG. 5B.

Referring generally to FIG. 1 and particularly to, e.g., FIGS. 3B, 4A, and 4B, first plurality of seats 1204 of first seat assembly 1200 and second plurality of seats 1214 of second seat assembly 1210 have equal numbers of seats. The preceding subject matter of this paragraph characterizes example 36 of the present disclosure, wherein example 36 also includes the subject matter according to any one of examples 26 to 35, above.

The same number of seats in first plurality of seats 1204 and second plurality of seats 1214, shown, for example, in FIG. 3B is used to maximize the overall seating capacity of vehicle, in comparison to a seat arrangement, shown, for example, in FIG. 3C. Furthermore, back supports of first plurality of seats 1204 are used as safety features by passengers in second plurality of seats 1214 during, for example, sudden deceleration of vehicle 1000. The same number of seats also enables passengers, seated in second plurality of seats 1214, to use the back sides of first plurality of seats 1204 for access to various convenience features, such as foldable trays, displays, and the like.

Specifically, each seat in second plurality of seats 1214 has a corresponding seat in first plurality of seats 1204. The back side of this seat in first plurality of seats 1204 is used to support these various features, utilized by a passenger in the seat of second plurality of seats 1214, in some examples.

Referring generally to FIG. 1 and particularly to, e.g., FIGS. 4A and 4B, second seat support 1212 is geometrically different from first seat support 1202. The preceding subject matter of this paragraph characterizes example 37 of the present disclosure, wherein example 37 also includes the subject matter according to any one of examples 26 to 36, above.

The geometric difference between first seat support 1202 and second seat support 1212 allows aligning first plurality of seats 1204 with second plurality of seats 1214 relative to virtual longitudinal plane 1012 even when seat tracks supporting these seat assemblies are offset. The track offset is used, for example, to avoid interference between primary pair of seat tracks 1300 and secondary pair of seat tracks 1310. However, the alignment or a different offset of first plurality of seats 1204 with second plurality of seats 1214 enables a straight aisle with a constant width.

Specifically, first seat assembly 1200 comprises first seat support 1202 attached to primary pair of seat tracks 1300, while second seat assembly 1210 comprises second seat support 1212 attached to secondary pair of seat tracks 1310. As shown in FIG. 3A, secondary pair of seat tracks 1310 is offset toward virtual longitudinal plane 1012 relative to primary pair of seat tracks 1300 or, at least, relative to first portions 1301 of primary pair of seat tracks 1300. As shown in FIG. 3B, each seat in first plurality of seats 1204 of first seat assembly 1200 is generally aligned with one seat in second plurality of seats 1214 of second seat assembly 1210 along virtual longitudinal axis 1010.

Referring generally to FIG. 1 and particularly to, e.g., FIG. 7, second plurality of seats 1214 of second seat assembly 1210 comprises one of plurality of aircraft seats, plurality of watercraft seats, or plurality of land-vehicle seats. The preceding subject matter of this paragraph characterizes example 38 of the present disclosure, wherein example 38 also includes the subject matter according to any one of examples 26 to 37, above.

An aircraft, a watercraft, or an automobile are all examples of vehicle 1000 carrying many passengers. Changing seating configurations in such types of vehicles is used, for example, to increase or decrease seating capacity, changing aisle width, and other purposes. Furthermore, seating system 1100 described herein can be easily reconfigured by an operator of vehicle 1000 without, for example, involving the manufacturer.

In some examples, different seat assemblies in vehicle 1000 are attached to and supported by various seat tracks. Using secondary pair of seat tracks 1310 in addition to primary pair of seat tracks 1300 allows using different seat configurations, e.g., to maximize passenger capacity, providing additional isle space, and the like.

Referring generally to FIG. 1 and particularly to, e.g., FIGS. 3B and 4B, second plurality of seats 1214 of second seat assembly 1210 comprises three seats. The preceding subject matter of this paragraph characterizes example 39 of the present disclosure, wherein example 39 also includes the subject matter according to any one of examples 26 to 38, above.

Second seat assembly 1210 is used to replace another seat assembly with fewer seats, thereby increasing the overall seating capacity of the vehicle. Furthermore, the number of seats in second plurality of seats 1214 is selected, for example, to provide various safety and comfort features for passengers in other pluralities of seats, e.g., a plurality of seats behind second plurality of seats 1214.

For example, this other seat assembly is positioned in a tail portion of the aircraft between an isle and a fuselage and includes only two seats. A combination of secondary pair of seat tracks 1310 and second plurality of seats 1214 is specifically designed, for example, to accommodate an additional seat in the same location as shown in FIGS. 3B and 4B.

Referring generally to FIG. 1 and particularly to, e.g., FIG. 3B, second seat assembly 1210 is configured to be positioned between first seat assembly 1200 and third seat assembly 1220, comprising third plurality of seats 1224. Second plurality of seats 1214 of second seat assembly 1210 and third plurality of seats 1224 have different numbers of seats. The preceding subject matter of this paragraph characterizes example 40 of the present disclosure, wherein example 40 also includes the subject matter according to any one of examples 26 to 39, above.

Type of seats, space available for the seats, orientation of the seats, and other factors determine the number of seats in each assembly, in some examples. However, assemblies having different numbers of seats are supported by the same tracks (primary pair of seat tracks 1300 in some examples).

For example, third seat assembly 1220 is positioned in a part of vehicle 1000 that has less space than the part where first seat assembly 1200 is positioned. As such, third plurality of seats 1224 of third seat assembly 1220 has fewer seats than first plurality of seats 1204 of first seat assembly 1200 as shown, for example, in FIG. 3B. Both third seat assembly 1220 and first seat assembly 1200 are attached to and supported by primary pair of seat tracks 1300.

Referring generally to FIG. 1 and particularly to, e.g., FIG. 3C, seating-system kit 1500 further comprises fourth seat assembly 1230, comprising fourth seat support 1232 and fourth plurality of seats 1234, attached to fourth seat support 1232. Fourth seat assembly 1230 is configured to be positioned, in lieu of second seat assembly 1210, between first seat assembly 1200 and third seat assembly 1220, comprising third plurality of seats 1224. Fourth seat support 1232 is configured to be attached to primary pair of seat tracks 1300. Fourth plurality of seats 1234 of fourth seat assembly 1230 and third plurality of seats 1224 have identical numbers of seats. The preceding subject matter of this paragraph characterizes example 41 of the present disclosure, wherein example 41 also includes the subject matter according to any one of examples 26 to 39, above.

In some examples, fourth seat assembly 1230 is interchangeable with second seat assembly 1210 in a space between first seat assembly 1200 and third seat assembly 1220. A combination of fourth seat assembly 1230 and second seat assembly 1210 is used to change the seating configuration of vehicle 1000.

For example, depending on the number of seats needed in vehicle 1000, either second seat assembly 1210 or fourth seat assembly 1230 is positioned in that space as schematically shown in FIGS. 3B and 3C. Different seat configurations utilize different seat tracks. Specifically, when second seat assembly 1210 is positioned in that space, second seat assembly 1210 is attached to secondary pair of seat tracks 1310. However, when fourth seat assembly 1230 is positioned in the space, fourth seat assembly 1230 is attached to primary pair of seat tracks 1300.

Referring generally to FIG. 1 and particularly to, e.g., FIGS. 3B and 3C, second plurality of seats 1214 of second seat assembly 1210 and fourth plurality of seats 1234 of fourth seat assembly 1230 have different numbers of seats. The preceding subject matter of this paragraph characterizes example 42 of the present disclosure, wherein example 42 also includes the subject matter according to example 41, above.

In some examples, fourth seat assembly 1230 is interchangeable with second seat assembly 1210 in a space between first seat assembly 1200 and third seat assembly 1220 and used to change the seating configuration of vehicle 1000.

In some examples, fourth seat assembly 1230 is used to increase the width of an aisle, while second seat assembly 1210 is used to increase the overall seating capacity of vehicle 1000. Once secondary pair of seat tracks 1310 is installed (e.g., attached to floor beams 1020), either fourth seat assembly 1230 or second seat assembly 1210 is used interchangeably allowing to reconfigure vehicle 1000 with minimal efforts.

Referring generally to FIG. 1 and particularly to, e.g., FIG. 3B, seats in second plurality of seats 1214 of second seat assembly 1210 are configured to be arranged along second row-axis 1211. Second seat support 1212 is configured to be attached to secondary pair of seat tracks 1310 such that second row-axis is perpendicular to virtual longitudinal plane 1012 of vehicle 1000. The preceding subject matter of this paragraph characterizes example 43 of the present disclosure, wherein example 43 also includes the subject matter according to any one of examples 26 to 42, above.

When second row-axis 1211 are perpendicular to virtual longitudinal plane 1012, passengers seated in second plurality of seats 1214 face in the direction parallel to virtual longitudinal axis 1010. Considering that most deceleration and acceleration of vehicle 1000 occurs along virtual longitudinal axis 1010, passenger convenience is improved with such orientations of second plurality of seats 1214.

Furthermore, when both first row-axis 1201 and second row-axis 1211 are perpendicular to virtual longitudinal plane 1012 as shown, for example, in FIG. 3B, elements on the back sides of first plurality of seats 1204 are utilized, for example, as convenience features for passengers seated in second plurality of seats 1214. Similarly, passengers are more comfortable and when acceleration of vehicle 1000 occurs in the direction that is perpendicular to back supports (and head rests) of their seats.

Referring generally to FIG. 1 and particularly to, e.g., FIGS. 3B, 4A, and 4B, first plurality of seats 1204 is configured to align with second plurality of seats 1214 along virtual longitudinal axis 1010. The preceding subject matter of this paragraph characterizes example 44 of the present disclosure, wherein example 44 also includes the subject matter according to any one of examples 26 to 43, above.

Aligning first plurality of seats 1204 of first seat assembly 1200 with second plurality of seats 1214 of second seat assembly 1210 along virtual longitudinal axis 1010 allows having a straight aisle, extending along virtual longitudinal axis 1010 of vehicle 1000, as shown, for example, in FIG. 3B. Furthermore, passengers in second plurality of seats 1214 are able to use various features of first plurality of seats 1204, such as foldable trays, attached to back supports of first plurality of seats 1204, video displays, positioned in the back supports, various types of holders, and the like.

As shown in FIG. 3B, each seat in first plurality of seats 1204 of first seat assembly 1200 is generally aligned with one seat in second plurality of seats 1214 of second seat assembly 1210 along virtual longitudinal axis 1010. In this example, the number of seats in first plurality of seats 1204 and the number of seats in second plurality of seats 1214 is the same. Furthermore, the seats (e.g., type, size) in first plurality of seats 1204 and in second plurality of seats 1214 are identical. When the numbers of seats are different or different types of seats are used in first plurality of seats 1204 and in second plurality of seats 1214, midpoints of first plurality of seats 1204 and second plurality of seats 1214 is aligned along virtual longitudinal axis 1010 of vehicle 1000.

Referring generally to FIG. 1 and particularly to, e.g., FIGS. 3B, 4A, and 4B, first plurality of seats 1204 comprises first inboard seat 1205, positioned closer to virtual longitudinal plane 1012 than all other seats in first plurality of seats 1204. Second plurality of seats 1214 comprises second inboard seat 1215, positioned closer to virtual longitudinal plane 1012 than all other seats in second plurality of seats 1214. First shortest distance $D_a$ between first inboard seat 1205 and virtual longitudinal plane 1012 is identical to second shortest distance $D_b$ between second inboard seat 1215 and virtual longitudinal plane 1012. The preceding subject matter of this paragraph characterizes example 45 of the present disclosure, wherein example 45 also includes the subject matter according to any one of examples 26 to 44, above.

Having the same shortest distance between inboard seats of different rows of seats and virtual longitudinal plane 1012 allows having a straight aisle, defined at least in part by first inboard seat 1205 and second inboard seat 1215.

In this example, the aisle extends along virtual longitudinal plane 1012. The straight aisle allows passengers to move and/or objects to be moved within vehicle 1000 without extensive turning and bumping into seats. Furthermore, the straight aisle is narrower than, for example, an aisle that is non-linear. Narrower aisles allow to put more seats into vehicles 1000, thereby increasing the passenger capacity of vehicle 1000.

Referring generally to FIG. 1 and particularly to, e.g., FIG. 5B, seating-system kit 1500 for vehicle 1000 is disclosed. Vehicle 1000 comprises floor beams 1020 and primary pair of seat tracks 1300, attached to floor beams 1020. Seating-system kit 1500 comprises secondary pair of seat tracks 1310, plurality of struts 1410, doubler 1460, and spacer 1440. Plurality of struts 1410 comprises at least one of first strut 1420 or second strut 1430 and is configured to provide a coupling interface between secondary pair of seat tracks 1310 and floor beams 1020. Doubler 1460 is configured to at least partially cover opening 1023 in one of floor beams 1020. Spacer 1440 is configured to be positioned in opening 1023 in one of floor beams 1020. At least portion of spacer 1440 is between doubler 1460 and second strut 1430 when second strut 1430 and doubler 1460 are attached to one of floor beams 1020. First strut 1420 is geometrically different from second strut 1430. The preceding subject matter of this paragraph characterizes example 46 of the present disclosure.

In some examples, seating-system kit 1500 is used to form new seating configurations in vehicle 1000, which has an original seating system with limited or no ability to reconfigure. During installation of seating-system kit 1500, secondary pair of seat tracks 1310 is added to vehicle 1000 that allows to reconfigure vehicle 1000 without disturbing primary pair of seat tracks 1300 positioned on vehicle 1000. For example, a seat assembly having a fewer number of seats and supported by primary pair of seat tracks 1300 is replaceable with second seat assembly 1210 having a larger number of seats and now supported secondary pair of seat tracks 1310, thereby increasing the overall seating capacity of vehicle 1000. Furthermore, having both primary pair of seat tracks 1300 and secondary pair of seat tracks 1310 on vehicle 1000 (by adding secondary pair of seat tracks 1310 to primary pair of seat tracks 1300 rather than replacing primary pair of seat tracks 1300 with secondary pair of seat tracks 1310) allows for quick reconfiguration of vehicle 1000.

Referring to various components of seating-system kit 1500, secondary pair of seat tracks 1310 is used for supporting second seat assembly 1210, which is replaceable with another seat assembly previously supported by primary pair of seat tracks 1300, once secondary pair of seat tracks 1310 is installed. Plurality of struts 1410 is used for attaching secondary pair of seat tracks 1310 to floor beams 1020 or, more specifically, to provide a coupling interface. Plurality of struts 1410 comprises at least one of first strut 1420 or second strut 1430. In some examples, first strut 1420 is used for attachment of secondary pair of seat tracks 1310 to some portions of floor beams 1020 (e.g., free from openings) while second strut 1430 is used for attachment to other portions of floor beams 1020 (e.g., near the opening). First strut 1420 is geometrically different from second strut 1430 to achieve different functionalities. In some examples, plurality of struts 1410 includes only one or more of first struts 1420, only one or more of second struts 1430, or a combination of one or more of first struts 1420 and one or more of second struts 1430. Doubler 1460 is used in locations where one of floor beams 1020 has opening 1023, e.g., to reinforce one of floor beams 1020 around opening 1023. When spacer 1440 is used, spacer 1440 is positioned in opening 1023 to bridge the space between doubler 1460 and, for example, second strut 1430 when second strut 1430 and doubler 1460 are attached to one of floor beams 1020.

Referring generally to FIG. 1 and particularly to, e.g., FIGS. 5C-1 and 5C-2, first strut 1420 comprises two first parallel side walls 1422 and first face wall 1424 that connects two first parallel side walls 1422. Second strut 1430 comprises two second parallel side walls 1432. Second strut 1430 also comprises second face wall 1434, connecting two second parallel side walls 1432. Second strut 1430 additionally comprises tabs 1436, extending from opposite sides of second face wall 1434 and perpendicular to two second parallel side walls 1432. The preceding subject matter of this paragraph characterizes example 47 of the present disclosure, wherein example 47 also includes the subject matter according to example 46, above.

In some examples, first strut 1420 and/or second strut 1430 is used for attaching secondary pair of seat tracks 1310 to different portions of floor beams 1020. First strut 1420 and second strut 1430 have different features to accommodate different requirements of these portions of floor beams 1020, such as reinforcement of floor beams 1020 around opening 1023, reducing the overall weight of seating system 1100 and vehicle 1000.

Specifically, first strut 1420 is attached to a portion of one of floor beams 1020 that does not have any beam openings as, for example, shown in FIG. 5B. First face wall 1424 of first strut 1420 is positioned against floor beam 1020 and one or more of plurality of second fasteners 1490 is installed through first face wall 1424 and floor beam 1020. On the other hand, second strut 1430 is attached to a portion of one of floor beams 1020, which has opening 1023 as, for example, also shown in FIG. 5B. Opening 1023 is used in one or more of floor beams 1020 for weight reduction and/or feeding cable, lines, and other components through vehicle 1000. In some examples, one of floor beams 1020 has multiple openings. Opening 1023, when it is present in one of floor beams 1020, reduces the interface area between second strut 1430 and one of floor beams 1020 and weakens one or more floor beams 1020 at the location of opening 1023. Tabs 1436 of second strut 1430 are used to increase the interface area with one of floor beams 1020. For example, one of tabs 1436 extends away from opening 1023. Furthermore, in some examples, another one of tabs 1436 overlaps with opening 1023, which is filled with spacer 1440.

Referring generally to FIG. 1 and particularly to, e.g., FIG. 5C-2, surfaces of second face wall 1434 and of tabs 1436 of second strut 1430, facing in one direction, are coplanar. The preceding subject matter of this paragraph characterizes example 48 of the present disclosure, wherein example 48 also includes the subject matter according to example 47, above.

The coplanar surfaces of second face wall 1434 and tabs 1436 of second strut 1430 allow increasing the contact area between second strut 1430 and floor beam 1020 when second strut 1430 is attached to floor beam 1020.

In some examples, one of floor beams 1020 has a planar surface. This surface is contacted by second strut 1430 during installation of second strut 1430. More specifically, this surface is contacted by second face wall 1434 and tabs 1436 of second strut 1430. When the surfaces of second face wall 1434 and tabs 1436 are coplanar, each one of these surfaces contacts the planar surface of one of floor beams 1020, thereby increasing the contact area.

Referring generally to FIG. 1 and particularly to, e.g., FIGS. 5B and 5C-2, tabs 1436 of second strut 1430 are offset relative to each other along longitudinal axis 1431 of second strut 1430. Longitudinal axis 1431 is parallel to each of two second parallel side walls 1432 and to second face wall 1434 of second strut 1430. The preceding subject matter of this paragraph characterizes example 49 of the present disclosure, wherein example 49 also includes the subject matter according to example 47 or 48, above.

In some examples, tabs 1436 of second strut 1430 are offset to avoid interference or to ensure overlap with other features of floor beams 1020. These features are positioned at different locations on floor beams 1020 and the position of tabs 1436 is specifically offset to accommodate these locations.

Referring to the example shown in FIG. 5B, the right one of tabs 1436 is positioned higher (along longitudinal axis 1431 and orientation in FIG. 5B) than the left one to avoid interference with bracket 1040, attached to one of floor beams 1020. In one example, the left one of tabs 1436 is positioned lower to ensure overlap with spacer 1440, positioned in opening 1023 of one of floor beams 1020. Other types of offset are also within the scope of this disclosure.

Referring generally to FIG. 1 and particularly to, e.g., FIG. 5B, at least one of tabs 1436 of second strut 1430 is configured to overlap at least a portion of opening 1023 in one of floor beams 1020. The preceding subject matter of this paragraph characterizes example 50 of the present disclosure, wherein example 50 also includes the subject matter according to any one of examples 47 to 49, above.

One tab of tabs 1436, overlapping the portion of opening 1023, provides support to second strut 1430 relative to one of floor beams 1020 even though this one of tabs 1436 or at least some parts of this one of tabs 1436 does not directly interface with one of floor beams 1020, in some examples.

In some examples, at least one of tabs 1436 overlaps at least the portion of opening 1023 in one of floor beams 1020 for attachment to spacer 1440, positioned in opening 1023, and doubler 1460, positioned on the other side of one of floor beams 1020. As such, one of tabs 1436 serves as a support feature for spacer 1440 and doubler 1460. This one of tabs allows positioning second face wall 1434 away from opening 1023.

Referring generally to FIG. 1 and particularly to, e.g., FIG. 5C-1, plurality of struts 1410 comprises only first strut 1420. The preceding subject matter of this paragraph characterizes example 51 of the present disclosure, wherein example 51 also includes the subject matter according to any one of examples 47 to 50, above.

First strut 1420 has a lower weight than second strut 1430 because first strut 1420 does not have tabs 1436, which are components of second strut 1430. If first strut 1420 can be used for attachment of secondary pair of seat tracks 1310 to floor beam 1020, first strut 1420 are used instead of second strut 1430, in some examples, thereby reducing the overall weight of seating system 1100 and that of vehicle 1000.

In some examples, first strut 1420 is attached to floor beams 1020 that do not have openings or at least to portions of floor beams 1020 that do not have openings. If such floor beams or such portions of floor beams are present first strut 1420 is used for weight saving consideration.

While the term "first strut 1420" is used in singular form, those skilled in the art would understand that multiple struts of this type are presented in plurality of struts 1410, in some examples. As such, the terms "only first strut 1420" and "only second strut 1430" should be viewed as types of struts in plurality of struts 1410, rather than only one strut being present in plurality of struts 1410.

Referring generally to FIG. 1 and particularly to, e.g., FIG. 5C-2, plurality of struts 1410 comprises only second strut 1430. The preceding subject matter of this paragraph characterizes example 52 of the present disclosure, wherein example 52 also includes the subject matter according to any one of examples 47 to 50, above.

In some examples, second strut 1430 is attached to one of floor beams 1020 at any locations, regardless of presence or absence of openings in floor beams 1020. As such, second strut 1430 is an example of a universal strut and, in some examples, is the only type of strut supplied in seating-system kit 1500 and used for any locations on floor beams 1020.

Often presence and/or position of openings in floor beams 1020 is unknown when seating-system kit 1500 is formed. Second strut 1430 is configured for attachment to floor beams 1020 at or near such openings as well as other locations, while first strut 1420 is not used in these examples.

Referring generally to FIG. 1 and particularly to, e.g., FIGS. 5A and 5B, plurality of struts 1410 comprises first strut 1420 and second strut 1430. The preceding subject matter of this paragraph characterizes example 53 of the present disclosure, wherein example 53 also includes the subject matter according to any one of examples 47 to 50, above.

A combination of first strut 1420 and second strut 1430 in seating-system kit 1500 allows installing seating-system kit 1500 on floor beams 1020 with openings without excessively increasing the weight of vehicle 1000. In some examples, this type of seating-system kit 1500 is used when presence and/or position of openings in floor beams 1020 are known.

For example, if the attachment point, on secondary pair of seat tracks 1310, does not have any openings, then first strut 1420 is used at this location, in one example. This example is shown in the left-hand side in FIG. 5B. First strut 1420 has a lower weight than second strut 1430, in some examples, and is used in such location. In other examples, second strut 1430 is used in such locations. Alternatively, if the attachment location on secondary pair of seat tracks 1310 has opening 1023 or is near the opening, then second strut 1430 is used. This example is shown in the right-hand side in FIG. 5B. In some examples, first strut 1420 is not be used in such locations, near or at opening 1023.

Referring generally to FIG. 1 and particularly to, e.g., FIG. 5F, wall 1025, containing opening 1023 in one of floor beams 1020, and spacer 1440 have equal thicknesses. The preceding subject matter of this paragraph characterizes example 54 of the present disclosure, wherein example 54 also includes the subject matter according to any one of examples 46 to 53, above.

In some examples, spacer 1440 and wall 1025 of floor beams 1020 have equal thicknesses to ensure that spacer 1440 is flush with both sides of wall 1025 during installation of seating-system kit 1500. This flush arrangement allows spacer 1440 to be in contact with both second strut 1430 and doubler 1460. Furthermore, this flush arrangement allows wall 1025 of floor beams 1020 to be in contact with both second strut 1430 and doubler 1460 around opening 1023 in wall 1025.

During installation of seating-system kit 1500, spacer 1440 is positioned into opening 1023 and is aligned with one side of wall 1025 around opening. In some examples, the alignment is assisted by second strut 1430 and doubler 1460. As such, one side of spacer 1440 and one side of wall 1025 are coplanar and contact one of second strut 1430 or doubler 1460. When spacer 1440 and wall 1025 of floor beams 1020 have equal thicknesses, the other side of spacer 1440 and the other side of wall 1025 are also coplanar and allow to contact the other one of second strut 1430 or doubler 1460. As such, the equal thicknesses allow spacer 1440 and floor beams 1020 to contact both second strut 1430 and doubler 1460 around opening 1023.

Referring generally to FIG. 1 and particularly to, e.g., FIGS. 5B and 5D, spacer 1440 and at least portion of opening 1023 in one of floor beams 1020 have mutually complementary shapes. The preceding subject matter of this paragraph characterizes example 55 of the present disclosure, wherein example 55 also includes the subject matter according to any one of examples 46 to 54, above.

The complementary shapes of spacer 1440 and at least portion of opening 1023 provide a larger interface between spacer 1440 and one of floor beams 1020, enabling support of larger loads between spacer 1440 and one of floor beams 1020. Furthermore, depending on these shapes, the load support is provided in more directions.

Spacer 1440 is positioned within opening 1023 and attached to second strut 1430 and doubler 1460 by, for example, one of plurality of second fasteners 1490. Second strut 1430 and doubler 1460 can be separately connected to one of floor beams 1020. Spacer 1440 is not attached to one of floor beams 1020 directly. Yet, spacer 1440 can transfer loads to and from one of floor beams 1020, thereby providing additional support to one of plurality of second fasteners 1490. This load transfer is performed through the interface between spacer 1440 and one of floor beams 1020 or, more specifically, between edges of spacers and edges of opening 1023 in one of floor beams 1020.

Referring generally to FIG. 1 and particularly to, e.g., FIGS. 5B and 5D, spacer 1440 has a shape, corresponding to a portion of a circle. The preceding subject matter of this paragraph characterizes example 56 of the present disclosure, wherein example 56 also includes the subject matter according to any one of examples 46 to 55, above.

When spacer 1440 has the shape corresponding to the portion of the circle and this shape is complementary to the shape of opening 1023 in one of floor beams 1020, the load support between spacer 1440 and one of floor beams 1020 is provided in different directions. These directions are perpendicular to the interface between spacer 1440 and opening 1023 in one of floor beams 1020, in some examples.

Spacer 1440 is positioned within opening 1023 and attached to second strut 1430 and doubler 1460 by, for example, one of plurality of second fasteners 1490. Second strut 1430 and doubler 1460 can be separately connected to one of floor beams 1020. Spacer 1440 is not attached to one of floor beams 1020 directly. Yet, spacer 1440 can transfer loads to and from one of floor beams 1020 thereby providing additional support to one of plurality of second fasteners 1490. This load transfer is performed through the interface between spacer 1440 and one of floor beams 1020 or, more specifically, between edges of spacers and edges of opening 1023 in one of floor beams 1020.

Referring generally to FIG. 1 and particularly to, e.g., FIGS. 5A and 5B, each of secondary pair of seat tracks 1310 is formed of aluminum. The preceding subject matter of this paragraph characterizes example 57 of the present disclosure, wherein example 57 also includes the subject matter according to any one of examples 46 to 56, above.

Aluminum is a lightweight material with good mechanical characteristics. Secondary pair of seat tracks 1310 are long structures and the weight of secondary pair of seat tracks 1310 is reduced when secondary pair of seat tracks 1310 is formed of aluminum in comparison, for example, to other common structural materials, such as steel.

When secondary pair of seat tracks 1310 is formed of aluminum, it has low weight yet provide good mechanical support to seat assemblies that are later attached to secondary pair of seat tracks 1310. Furthermore, aluminum tracks of secondary pair of seat tracks 1310 can be easily attached to other types of materials, such as floor beams 1020 (e.g., formed from composite materials) and plurality of struts 1410 (e.g., formed of titanium).

Referring generally to FIG. 1 and particularly to, e.g., FIGS. 2, 5A, 5B, 5C-1 and 5C-2, plurality of struts 1410 is formed of titanium. The preceding subject matter of this paragraph characterizes example 58 of the present disclosure, wherein example 58 also includes the subject matter according to any one of examples 46 to 57, above.

Titanium is a lightweight material with good mechanical characteristics. However, titanium is expensive and, in some examples, is used primarily for small parts, such as plurality of struts 1410.

When plurality of struts 1410 is formed of titanium, it has low weight yet provide good mechanical support to secondary pair of seat tracks 1310 that are later attached to plurality of struts 1410 and to seat assemblies that are later attached to secondary pair of seat tracks 1310. Furthermore, titanium struts can be easily attached to other types of materials, such as floor beams 1020 (e.g., formed of composite materials) and secondary pair of seat tracks 1310 (e.g., formed of aluminum).

Referring generally to FIG. 1 and particularly to, e.g., FIGS. 5B, 5E, and 5F, one of plurality of struts 1410 is configured to receive one of plurality of first fasteners 1480 to attach one of plurality of struts 1410 to secondary pair of seat tracks 1310. One of plurality of struts 1410 is further configured to receive one of plurality of second fasteners 1490 to attach one of plurality of struts 1410 to one of floor beams 1020. The preceding subject matter of this paragraph characterizes example 59 of the present disclosure, wherein example 59 also includes the subject matter according to any one of examples 46 to 58, above.

In one example, one type of fasteners (e.g., plurality of first fasteners 1480) is configured to attach one of plurality of struts 1410 to secondary pair of seat tracks 1310. In another example, fasteners of same or different type are configured to attach one of plurality of struts 1410 to secondary pair of seat tracks 1310.

For example, one of plurality of first fasteners 1480 may protrude through a side wall of a strut (e.g., one of two first parallel side walls 1422 of first strut 1420 or one of two second parallel side walls 1432 of second strut 1430) and through a wall of a track of secondary pair of seat tracks 1310. In some examples, one of plurality of first fasteners 1480 passes through both side walls of the same strut (e.g., two first parallel side walls 1422 of first strut 1420 or two second parallel side walls 1432 of second strut 1430) in addition to protruding through the track of secondary pair of seat tracks 1310. In some examples, one of plurality of second fasteners 1490 protrudes through a face wall of a strut (e.g., first face wall 1424 of first strut 1420 or second face wall 1433 of second strut 1430) and wall 1025 of one of floor beams 1020. Furthermore, in some examples, another one of plurality of second fasteners 1490 fastener protrudes through one of tabs 1436 of second strut 1430, spacer 1440, and doubler 1460, attaching these three components together.

In some examples, plurality of first fasteners 1480 is structurally the same or different from plurality of second fasteners 1490. Some examples of plurality of first fasteners 1480 and/or plurality of second fasteners 1490 include, but are not limited to, HI-LOK® fasteners, bolts, screws, and rivets.

Referring generally to FIG. 1 and particularly to, e.g., FIGS. 5B, 5E, and 5F, seating-system kit 1500 further comprises plurality of second fasteners 1490. One of plurality of second fasteners 1490 is configured to protrude through one of plurality of struts 1410 and one of floor beams 1020 and to attach one of plurality of struts 1410 to one of floor beams 1020. The preceding subject matter of this paragraph characterizes example 60 of the present disclosure, wherein example 60 also includes the subject matter according to example 59, above.

In some examples, plurality of second fasteners 1490 is different from plurality of first fasteners 1480 and used specifically for attaching second strut 1430 to spacer 1440 and doubler 1460 and/or for attaching second strut 1430 to one of floor beams 1020. In some examples, seating-system kit 1500 includes both plurality of first fasteners 1480 and plurality of second fasteners 1490.

For example, plurality of second fasteners 1490 has different size than plurality of first fasteners 1480 or be of different types because of their different attachment applications. In some examples, the number of fasteners in plurality of first fasteners 1480 and in plurality of second fasteners 1490 in seating-system kit 1500 depends on a number of attachment points for each of type of attachment.

Referring generally to FIG. 1 and particularly to, e.g., FIG. 5C-2, one of plurality of struts 1410 is second strut 1430, comprising two second parallel side walls 1432, second face wall 1434, and tabs 1436. Second face wall 1434 connects two second parallel side walls 1432. Tabs 1436 extend from opposite sides of second face wall 1434 and are perpendicular to two second parallel side walls 1432. One of plurality of second fasteners 1490 is configured to protrude through doubler 1460, one of floor beams 1020, and one of second face wall 1434 or one of tabs 1436 and to attach doubler 1460, one of floor beams 1020, and one of second face wall 1434 or one of tabs 1436. The preceding subject matter of this paragraph characterizes example 61 of the present disclosure, wherein example 61 also includes the subject matter according to example 60, above.

In some examples, one or more of plurality of second fasteners 1490 is used for attachment of second strut 1430 directly to one of floor beams 1020, attachment of second strut 1430 to spacer 1140 and doubler 1460, attachment of doubler 1460 to one of floor beams 1020, or various combinations of these attachments.

In some examples, one or more of plurality of second fasteners 1490 is used for attachment of second strut 1430 directly to one of floor beams 1020, attachment of second strut 1430 to spacer 1440 and doubler 1460, attachment of doubler 1460 to one of floor beams 1020, or various combinations of these attachments.

Specifically, during installation of seating-system kit 1500, one of plurality of second fasteners 1490 protrudes through second face wall 1433 of second strut 1430 and wall 1025 of one of floor beams 1020. Furthermore, another one of plurality of second fasteners 1490 fastener protrudes through one of tabs 1436 of second strut 1430, spacer 1440, and doubler 1460, attaching these three components together.

Referring generally to FIG. 1 and particularly to, e.g., FIGS. 5B, 5E, and 5F, Seating-system kit 1500 further comprises plurality of first fasteners 1480. One of plurality of first fasteners 1480 is configured to protrude through one of secondary pair of seat tracks 1310 and one of plurality of struts 1410 and to attach one of secondary pair of seat tracks 1310 to one of plurality of struts 1410. The preceding subject matter of this paragraph characterizes example 62 of the present disclosure, wherein example 62 also includes the subject matter according to any one of examples 59 to 61, above.

In some examples, plurality of first fasteners 1480 is configured to attach secondary pair of seat tracks 1310 and plurality of struts 1410 during installation of seating-system kit 1500 on vehicle 1000 and to support secondary pair of seat tracks 1310 and plurality of struts 1410 with respect to each other during operation of vehicle 1000.

In some examples, one of plurality of first fasteners 1480 protrudes through a side wall of a strut (e.g., one of two first parallel side walls 1422 of first strut 1420) and through a wall of a track of secondary pair of seat tracks 1310. In some examples, one of plurality of first fasteners 1480 protrudes through both side walls of the same strut (e.g., two first parallel side walls 1422 of first strut 1420) in addition to protruding through the track of secondary pair of seat tracks 1310.

Referring generally to FIG. 1 and particularly to, e.g., FIG. 5C-2, one of plurality of struts 1410 is second strut 1430, comprising two second parallel side walls 1432, second face wall 1434, and tabs 1436. Second face wall 1434 connects two second parallel side walls 1432. Tabs 1436 extend from opposite sides of second face wall 1434 and are perpendicular to two second parallel side walls 1432. One of plurality of first fasteners 1480 is configured to protrude through at least one of two second parallel side walls 1432. The preceding subject matter of this paragraph characterizes example 63 of the present disclosure, wherein example 63 also includes the subject matter according to example 62, above.

In some examples, two second parallel side walls 1432 of second strut 1430 interface with one of secondary pair of seat tracks 1310, while one or more of plurality of first fasteners 1480 are configured to force two second parallel side walls 1432 against one of secondary pair of seat tracks 1310, thereby supporting second strut 1430 relative to one of secondary pair of seat tracks 1310.

In some examples, one of plurality of first fasteners 1480 protrudes through a side wall of a strut (e.g., one of two first parallel side walls 1422 of first strut) and through a wall of a track of secondary pair of seat tracks 1310. In some examples, one of plurality of first fasteners 1480 protrudes through both side walls of the same strut (e.g., two first parallel side walls 1422 of first strut 1420), in addition to protruding through the track of secondary pair of seat tracks 1310.

Referring generally to FIG. 1 and particularly to, e.g., FIG. 2, seating-system kit 1500 further comprises adhesive 1470 to bond doubler 1460 to one of floor beams 1020. The preceding subject matter of this paragraph characterizes example 64 of the present disclosure, wherein example 64 also includes the subject matter according to any one of examples 46 to 63, above.

In some examples, adhesive 1470 provides an adhesion bond between doubler 1460 and one of floor beams 1020 (e.g., to support doubler 1460 relative to one of floor beams 1020 during and after installation of seating-system kit 1500). Furthermore, adhesive 1470 ensures a larger contact interface between doubler 1460 and one of floor beams 1020 and more uniform load distribution between doubler 1460 and one of floor beams 1020.

In some examples, adhesive 1470 is used instead or in addition to fasteners, such as plurality of second fasteners 1490. Some examples of adhesive 1470 include, but are not limited to, epoxy adhesives, polyurethane adhesives, methyl methacrylate adhesives, silicone adhesives, and the like. Some examples of adhesive 1470, which is a single-component adhesive, include a heat-curable adhesive, a moisture-curable adhesive (e.g., moisture in the air) and/or a radiation-curable adhesive.

Referring generally to FIG. 1 and particularly to, e.g., FIG. 2, seating-system kit 1500 further comprises adhesive 1470 to bond doubler 1460 to one of floor beams 1020 and to spacer 1440. The preceding subject matter of this paragraph characterizes example 65 of the present disclosure, wherein example 65 also includes the subject matter according to any one of examples 46 to 63, above.

In some examples, adhesive 1470 provides an adhesion bond between doubler 1460 and one of floor beams 1020 and spacer 1440 (e.g., to support doubler 1460 and/or spacer 1440 relative to one of floor beams 1020 during and after installation of seating-system kit 1500). Furthermore, adhesive 1470 ensures a larger contact interface between doubler 1460 and one of floor beams 1020 as well as between doubler 1460 and spacer 1440 and more uniform load distribution between these components.

In some examples, adhesive 1470 is used instead or in addition to fasteners, such as plurality of second fasteners 1490. Some examples of adhesive 1470 include, but are not limited to, epoxy adhesives, polyurethane adhesives, methyl methacrylate adhesives, silicone adhesives, and the like. Some examples of adhesive 1470, which is a single-component adhesive, include a heat-curable adhesive, a moisture-curable adhesive (e.g., moisture in the air) and/or a radiation-curable adhesive.

Referring generally to FIG. 1 and particularly to, e.g., FIG. 5G, doubler 1460 is configured to fully overlap opening 1023 in one of floor beams 1020. The preceding subject matter of this paragraph characterizes example 66 of the present disclosure, wherein example 66 also includes the subject matter according to any one of examples 46 to 65, above.

When doubler 1460 fully overlaps opening 1023 in one of floor beams 1020, doubler 1460 is in contact with the entire edge of opening 1023 and provides support to this edge without creating any stress point. As such, doubler 1460 reinforces one of floor beams 1020, considering that second strut 1430 is attached to one of floor beams 1020 at this location.

In some examples, doubler 1460 interfaces with one side of one of floor beams 1020 and extend over opening 1023 fully overlapping opening 1023. Doubler 1460 is glued to one of floor beams 1020 and/or is attached to one of floor beams 1020 using one or more of plurality of second fasteners 1490. Doubler 1460 evenly distributes loads throughout one of floor beams 1020 without creating stress points at the edge of opening 1023.

Referring generally to FIG. 1 and particularly to, e.g., FIG. 5C-2 and FIG. 5G, one of plurality of struts 1410 is second strut 1430, comprising two second parallel side walls 1432, second face wall 1434, and tabs 1436. Second face wall 1434 connects two second parallel side walls 1432. Tabs 1436 extend from opposite sides of second face wall 1434 and are perpendicular to two second parallel side walls 1432. Doubler 1460 is configured to fully overlap one of tabs 1436 and spacer 1440. The preceding subject matter of this paragraph characterizes example 67 of the present disclosure, wherein example 67 also includes the subject matter according to any one of examples 46 to 66, above.

In some examples, connecting second strut 1430 to one of floor beams 1020 around opening 1023 in one of floor beams 1020 is performed using a combination of doubler 1460, spacer 1440, and one of tabs 1436 of second strut 1430 without creating excessive stresses on one of floor beams 1020 near opening 1023. During installation of seating-system kit 1500, one of tabs 1436 overlaps with doubler 1460. Spacer 1440 is positioned between one of tabs 1436 and doubler 1460 and allows to transfer loads between one of tabs 1436 and doubler 1460 through opening 1023 in one of floor beams 1020. Doubler 1460 then distributes the loads away from opening 1023.

In some examples, doubler 1460 interfaces with one side of one of floor beams 1020 and extend over opening 1023 fully overlapping opening 1023. Doubler 1460 is glued to one of floor beams 1020 and/or is attached to one of floor beams 1020 using one or more of plurality of second fasteners 1490. Furthermore, in some examples, doubler 1460 interfaces with spacer 1440, which in turn interfaces with one of tabs 1436 of second strut 1430. Doubler 1460 is glued or otherwise attached to spacer 1440, which in turn is glued or attached to one of tabs 1436 of second strut 1430. In some examples, doubler 1460, spacer 1440, and one of tabs 1436 of second strut 1430 are attached using one or more of plurality of second fasteners 1490.

Referring generally to FIG. 6 and particularly to, e.g., FIGS. 3A, 3C, 4A, and 4B, method 6000 of configuring seating system 1100 of vehicle 1000 is disclosed. Vehicle 1000 comprises floor beams 1020. Seating system 1100 comprises primary pair of seat tracks 1300, attached to floor beams 1020 and supporting first seating assembly 1200. Method 6000 comprises (block 6200) attaching secondary pair of seat tracks 1310 to floor beams 1020 of vehicle 1000 such that one of secondary pair of seat tracks 1310 is positioned between seat tracks of primary pair of seat tracks 1300. The preceding subject matter of this paragraph characterizes example 68 of the present disclosure.

Attaching secondary pair of seat tracks 1310 to floor beams 1020 of 1000, which already comprises primary pair of seat tracks 1300, allows changing seating configurations of vehicle 1000 with minimal efforts. In some examples, primary pair of seat tracks 1300 and secondary pair of seat tracks 1310 are configured and used to support different types of seat assemblies (e.g., seat assemblies with different number of seats). These types of seat assemblies are interchangeable in the same general location. One seat assembly is used, for example, to increase the seating capacity of vehicle 1000, while another seat assembly is used, for example, to increase aisle space.

In some examples, to avoid interference between primary pair of seat tracks 1300 and secondary pair of seat tracks 1310, these pairs are shifted relative to each other in the direction, perpendicular to virtual longitudinal plane 1012. The degree of this shift is less than the track width of either primary pair of seat tracks 1300 or secondary pair of seat tracks 1310, in some examples. As such, one of secondary pair of seat tracks 1310 is positioned between the seat tracks of primary pair of seat tracks 1300 and first seat assembly 1200. In some examples, the track widths of primary pair of seat tracks 1300 and secondary pair of seat tracks 1310 are identical.

In one example, secondary pair of seat tracks 1310 is attached to floor beams 1020 of vehicle 1000 using various fastening hardware 1400, such as plurality of struts 1410, comprising, e.g., first strut 1420 and/or second strut 1430. In some examples, fastening hardware 1400 comprises doubler 1460 and spacer 1440, usable for attaching secondary pair of seat tracks 1310 to floor beams 1020, comprising opening 1023.

Referring generally to FIG. 6 and particularly to, e.g., FIGS. 3A and 4B, according to method 6000, (block 6200) attaching secondary pair of seat tracks 1310 to floor beams 1020 of vehicle 1000 is performed such that only one of secondary pair of seat tracks 1310 is positioned between seat tracks of primary pair of seat tracks 1300. The preceding subject matter of this paragraph characterizes example 69 of the present disclosure, wherein example 69 also includes the subject flatter according to example 68, above.

Attaching one of secondary pair of seat tracks 1310 between the seat tracks of primary pair of seat tracks 1300 avoids interference between secondary pair of seat tracks 1310 and primary pair of seat tracks 1300. In some examples, secondary pair of seat tracks 1310 is shifted relative primary pair of seat tracks 1300 in the direction, perpendicular to virtual longitudinal plane 1012. When the degree of shift is less than the width of primary pair of seat tracks 1300, only one of secondary pair of seat tracks 1310 is attached between seat tracks of primary pair of seat tracks 1300. At the same time, in some examples, the degree of shift is minimal to ensure that seat assemblies supported by primary pair of seat tracks 1300 and secondary pair of seat tracks 1310 are aligned along virtual longitudinal axis 1010.

Attaching only one of secondary pair of seat tracks 1310 between the seat tracks of primary pair of seat tracks 1300 also enables use of seat tracks with similar track widths. In some examples, a certain minimum track width is needed to provide support to seat assemblies attached to primary pair of seat tracks 1300 and secondary pair of seat tracks 1310, particularly in when vehicle 1000 is moving. In some examples, the track widths of primary pair of seat tracks 1300 and secondary pair of seat tracks 1310 are constant and are substantially the same (e.g., varying by less than 10% or even varying by less than 5%). This features also allows combining bend and straight tracks without interference. For example, FIG. 3A illustrates primary pair of seat tracks 1300 having first portions 1301 and second portions 1302 oblique to first portions 1301. Secondary pair of seat tracks 1310 are straight.

Referring generally to FIG. 6 and particularly to, e.g., FIG. 3A, according to method 6000, (block 6200) attaching secondary pair of seat tracks 1310 to floor beams 1020 of vehicle 1000 is performed such that only one of secondary pair of seat tracks 1310 is positioned between seat tracks of primary pair of seat tracks 1300 along its entire length. The preceding subject matter of this paragraph characterizes example 70 of the present disclosure, wherein example 70 also includes the subject matter according to example 69, above.

Positioning one of secondary pair of seat tracks 1310 between the seat tracks of primary pair of seat tracks 1300 along the entire length of secondary pair of seat tracks 1310 allows to avoid interference between secondary pair of seat tracks 1310 and primary pair of seat tracks 1300 along that length. Furthermore, positioning one of secondary pair of seat tracks 1310 between seat tracks of primary pair of seat tracks 1300 along the entire length of secondary pair of seat tracks 1310 provides support to secondary pair of seat tracks 1310 along its entire length and enables the use of secondary pair of seat tracks 1310 that is shorter and, therefore, has lower weight without sacrificing support and load distribution characteristics of seating system 1100.

In some examples, when installed, primary pair of seat tracks 1300 and secondary pair of seat tracks 1310 are both attached to the same set of floor beams 1020. Primary pair of seat tracks 1300 is longer and attached to a large number of floor beams 1020 thereby allowing more uniform load distribution. The same set of floor beams 1020, to which both primary pair of seat tracks 1300 and secondary pair of seat tracks 1310 are attached, allows for load redistribution between primary pair of seat tracks 1300 and secondary pair of seat tracks 1310.

Referring generally to FIG. 6 and particularly to, e.g., FIG. 3B, method 6000 further comprises, prior to (block 6200) attaching secondary pair of seat tracks 1310 to floor beams 1020, (block 6050) detaching first seat assembly 1200 from primary pair of seat tracks 1300. Method 6000 further comprises, after (block 6200) attaching secondary pair of seat tracks 1310 to floor beams 1020, (block 6800) reattaching first seat assembly 1200 to primary pair of seat tracks 1300. The preceding subject matter of this paragraph characterizes example 71 of the present disclosure, wherein example 71 also includes the subject matter according to any one of examples 68 to 70, above.

Detaching first seat assembly 1200 from primary pair of seat tracks 1300 provides access to floor beams 1020 to which secondary pair of seat tracks 1310 is attached to. In some examples, a portion of secondary pair of seat tracks 1310 extends under first seat assembly 1200 even though first seat assembly 1200 is not supported by secondary pair of seat tracks 1310.

In some examples, detaching first seat assembly 1200 from primary pair of seat tracks 1300 involves removal of fasteners (e.g., bolts) extending between first seat assembly 1200 and primary pair of seat tracks 1300. In some examples, these fasteners are reused when first seat assembly 1200 is reattached to primary pair of seat tracks 1300. First seat assembly 1200 is reattached to primary pair of seat tracks 1300 after secondary pair of seat tracks 1310 is attached to floor beams 1020 and no further access to floor beams 1020 is not needed.

Referring generally to FIG. 6 and particularly to, e.g., FIGS. 4A and 4B, method 6000 further comprises, prior to (block 6200) attaching secondary pair of seat tracks 1310 to floor beams 1020, (block 6100) detaching floor panels 1060 from primary pair of seat tracks 1300. Method 6000 also comprises, after (block 6200) attaching secondary pair of seat tracks 1310 to floor beams 1020, (block 6700) attaching floor panels 1060 to primary pair of seat tracks 1300 and to secondary pair of seat tracks 1310. The preceding subject matter of this paragraph characterizes example 72 of the present disclosure, wherein example 72 also includes the subject matter according to any one of examples 68 to 71, above.

Detaching (block 6100) floor panels 1060 from primary pair of seat tracks 1300 provides access to floor beams 1020 to which secondary pair of seat tracks 1310 is attached to. Once secondary pair of seat tracks 1310 is attached to floor beams 1020 and no further access is needed to floor beams 1020, floor panels 1060 are reinstalled. In one example, the floor panels are identical to each other. In another example, at least some of the floor panels are structurally different from other floor panels.

In some examples, floor panels 1060 are initially attached to primary pair of seat tracks 1300 and extend between primary pair of seat tracks 1300. Once secondary pair of seat tracks 1310 is attached to floor beams 1020 and no further access is needed to floor beams 1020, floor panels 1060 are attached to both primary pair of seat tracks 1300 and secondary pair of seat tracks 1310. In some examples, floor panels 1060 extend between each pair of adjacent tracks, such that each pair is formed by one track of primary pair of seat tracks 1300 and one track of secondary pair of seat tracks 1310.

Referring generally to FIG. 6 and particularly to, e.g., FIG. 4B, method 6000 further comprises, after (block 6200) attaching secondary pair of seat tracks 1310, (block 6900) attaching second seat assembly 1210 to secondary pair of seat tracks 1310. The preceding subject matter of this paragraph characterizes example 73 of the present disclosure, wherein example 73 also includes the subject matter according to any one of examples 68 to 72, above.

Once secondary pair of seat tracks 1310 is attached to floor beams 1020, secondary pair of seat tracks 1310 is able to support second seat assembly 1210, and second seat assembly 1210 is attached to secondary pair of seat tracks 1310. In some examples, second seat assembly 1210 replaces another seat assembly in order, for example, to change the seating configuration of vehicle 1000.

Attaching second seat assembly 1210 to secondary pair of seat tracks 1310 may involve installing fasteners (e.g., bolts) extending between second seat assembly 1210 to secondary pair of seat tracks 1310. In some examples, second seat assembly 1210 is attached at a particular distance from first seat assembly 1200. In some examples, additional seat assemblies are attached to secondary pair of seat tracks 1310 during this operation.

Referring generally to FIG. 6 and particularly to, e.g., FIGS. 3B, 4A, and 4B, according to method 6000, first seat assembly 1200 comprises first seat support 1202 and first plurality of seats 1204, attached to first seat support 1202. Second seat assembly 1210 comprises second seat support 1212 and second plurality of seats 1214, attached to second seat support 1212. First plurality of seats 1204 and second plurality of seats 1214 have equal numbers of seats. The preceding subject matter of this paragraph characterizes example 74 of the present disclosure, wherein example 74 also includes the subject matter according to example 73, above.

In some examples, the same number of seats in first plurality of seats 1204 and second plurality of seats 1214, shown in FIG. 3B, is used to maximize the overall seating capacity of vehicle, in comparison, for example to a seat arrangement, shown in FIG. 3C. Furthermore, back supports of first plurality of seats 1204 are used as safety features by passengers in second plurality of seats 1214 during, for example, sudden deceleration of vehicle 1000. The same number of seats also allows passengers, seated in second plurality of seats 1214, to use the back sides of first plurality of seats 1204 for access to various features, such as foldable trays, displays, and the like.

Specifically, each seat in second plurality of seats 1214 has a corresponding seat in first plurality of seats 1204. The back side of this seat in first plurality of seats 1204 are used to support these various features and utilized by a passenger in the seat of second plurality of seats 1214.

Referring generally to FIG. 6 and particularly to, e.g., FIGS. 3B, 4A, and 4B, according to method 6000, (block 6900) attaching second seat assembly 1210 to secondary pair of seat tracks 1310 comprises (block 6910) attaching second seat support 1212 of second seat assembly 1210 to secondary pair of seat tracks 1310. Second seat support 1212 is geometrically different from first seat support 1202 attached to primary pair of seat tracks 1300. The preceding subject matter of this paragraph characterizes example 75 of the present disclosure, wherein example 75 also includes the subject matter according to example 74, above.

The geometric difference between first seat support 1202 and second seat support 1212 enables alignment of first plurality of seats 1204 with second plurality of seats 1214 relative to virtual longitudinal plane 1012 even when seat tracks supporting these seat assemblies are offset. In some examples, the track offset is used to avoid interference between primary pair of seat tracks 1300 and secondary pair of seat tracks 1310. However, the alignment or a different offset of first plurality of seats 1204 with second plurality of seats 1214 allows to have a straight aisle with a constant width.

Specifically, first seat assembly 1200 comprises first seat support 1202 attached to primary pair of seat tracks 1300, while second seat assembly 1210 comprises second seat support 1212 attached to secondary pair of seat tracks 1310. As shown in FIG. 3A, secondary pair of seat tracks 1310 is offset toward virtual longitudinal plane 1012 relative to primary pair of seat tracks 1300 or, at least, relative to first portions 1301 of primary pair of seat tracks 1300. As shown in FIG. 3B, each seat in first plurality of seats 1204 of first seat assembly 1200 is generally aligned with one seat in second plurality of seats 1214 of second seat assembly 1210 along virtual longitudinal axis 1010.

Referring generally to FIG. 6 and particularly to, e.g., FIGS. 5B, 5E, and 5F, according to method 6000, (block 6910) attaching second seat support 1212 of second seat assembly 1210 to secondary pair of seat tracks 1310 comprises (block 6915) installing plurality of third fasteners 1495, each extending through second seat support 1212 and one of secondary pair of seat tracks 1310. The preceding subject matter of this paragraph characterizes example 76 of the present disclosure, wherein example 76 also includes the subject matter according to example 75, above.

Plurality of third fasteners 1495 secure second seat support 1212 to one of secondary pair of seat tracks 1310. As such, during operation of vehicle 1000, second seat assembly 1210 retains its position with rest to secondary pair of seat tracks 1310 and the rest of vehicle 1000.

In some examples, plurality of third fasteners 1495 is the same as or different from plurality of first fasteners 1480 or plurality of second fasteners 1490. Some examples include, but are not limited to, HI-LOK® fasteners, bolts, screws, and rivets. In some examples, plurality of third fasteners 1495 are installed after installing floor panels 1060. For example, portions of secondary pair of seat tracks 1310 protrudes above floor panels 1060 and be used for attaching second seat support 1212 of second seat assembly 1210.

Referring generally to FIG. 6 and particularly to, e.g., FIG. 3A, according to method 6000, (block 6200) attaching secondary pair of seat tracks 1310 to floor beams 1020 comprises (block 6210) aligning secondary pair of seat tracks 1310 to floor beams 1020 such that each seat track in secondary pair of seat tracks 1310 is perpendicular to each of floor beams 1020. The preceding subject matter of this paragraph characterizes example 77 of the present disclosure, wherein example 77 also includes the subject matter according to any one of examples 68 to 76, above.

In some examples, complexity of connecting secondary pair of seat tracks 1310 to floor beams 1020 is reduced when each seat track in secondary pair of seat tracks 1310 is perpendicular to each of floor beams 1020. For example, various rectangular features of plurality of struts 1410 are utilized for this operation.

In some examples, floor beams 1020 are perpendicular to virtual longitudinal plane 1012. As such, when the seat tracks of secondary pair of seat tracks 1310 are each parallel to virtual longitudinal axis 1010, these seat tracks are also perpendicular to floor beams 1020, simplifying the attachment of secondary pair of seat tracks 1310 to floor beams 1020. Furthermore, such attachments are able to support larger loads that for example, when secondary pair of seat tracks 1310 are not perpendicular to floor beams 1020.

Referring generally to FIG. 6 and particularly to, e.g., FIGS. 5B, 5C-1, and 5C-2, according to method 6000, (block 6200) attaching secondary pair of seat tracks 1310 to floor beams 1020 comprises (block 6300) attaching plurality of struts 1410 to floor beams 1020 and (block 6400) attaching secondary pair of seat tracks 1310 to plurality of struts 1410. Plurality of struts 1410 comprises at least one of first strut 1420 or second strut 1430. The preceding subject matter of this paragraph characterizes example 78 of the present disclosure, wherein example 78 also includes the subject matter according to any one of examples 68 to 77, above.

Plurality of struts 1410 is used for attaching secondary pair of seat tracks 1310 to floor beams 1020 or, more specifically, to provide a coupling interface.

Plurality of struts 1410 comprises at least one of first strut 1420 or second strut 1430. In some examples, first strut 1420 is used for attachment of secondary pair of seat tracks 1310 to some portions of floor beams 1020 (e.g., free from openings) while second strut 1430 is used for attachment to other portions of floor beams 1020 (e.g., near the opening). First strut 1420 is geometrically different from second strut 1430 to achieve different functionalities. In some examples, plurality of struts 1410 includes only one or more of first struts 1420, only one or more of second struts 1430, or a combination of one or more of first struts 1420 and one or more of second struts 1430. In some examples, doubler 1460 is used in where one of floor beams 1020 has opening 1023, e.g., to reinforce one of floor beams 1020 around opening 1023. In some examples, spacer 1440 is positioned in opening 1023 to bridge the space between doubler 1460 and, for example, second strut 1430 when second strut 1430 and doubler 1460 are attached to one of floor beams 1020.

Referring generally to FIG. 6 and particularly to, e.g., FIG. 5B, according to method 6000, one of floor beams 1020 comprises opening 1023 and (block 6300) attaching plurality of struts 1410 to one of floor beams 1020 comprises (block 6305) attaching second strut 1430 to one of floor beams 1020. Second strut 1430 comprises two second parallel side walls 1432, second face wall 1434, and tabs 1436. Second face wall 1434 connects two second parallel side walls 1432. Tabs 1436 extend from opposite sides of second face wall 1434 and are perpendicular to two second parallel side walls 1432. One of tabs 1436 at least partially covers opening 1023. The preceding subject matter of this paragraph characterizes example 79 of the present disclosure, wherein example 79 also includes the subject matter according to example 78, above.

One tab of tabs 1436, overlapping the portion of opening 1023, provides support to second strut 1430 relative to one of floor beams 1020 even though this one of tabs 1436 or at least some parts of this one of tabs 1436 dies not directly interface with one of floor beams 1020.

In some examples, at least one of tabs 1436 overlaps at least a portion of opening 1023 in one of floor beams 1020 for attachment to spacer 1440 positioned in opening 1023 and doubler 1460 positioned on the other side of one of floor beams 1020. As such, one of tabs 1436 serves as a support feature for spacer 1440 and doubler 1460. This one of tabs allows positioning second face wall 1434 away from opening 1023.

Referring generally to FIG. 6 and particularly to, e.g., FIGS. 5D and 5G, according to method 6000, one of floor beams 1020 comprises first side 1024 and second side 1026, opposite first side 1024, and (block 6305) attaching second strut 1430 to one of floor beams 1020 comprises: (block 6320) positioning doubler 1460 against first side 1024 of one of floor beams 1020, (block 6340) positioning second strut 1430 against second side 1026 of one of floor beams 1020, (block 6360) forming one of plurality of fastener openings 1027 through second strut 1430, one of floor beams 1020, and doubler 1460, and (block 6380) installing one of plurality of second fasteners 1490 through one of plurality of fastener openings 1027 to interconnect second strut 1430, one of floor beams 1020, and doubler 1460. The preceding subject matter of this paragraph characterizes example 80 of the present disclosure, wherein example 80 also includes the subject matter according to example 79, above.

In some examples, doubler 1460 is connected to second strut 1430 and one of floor beams 1020 to reinforce one of floor beams 1020 and to redistribute the load away from the connection point. For example, the connection point is at or near opening 1023 in one of floor beams 1020.

When doubler 1460 is connected to second strut 1430 and one of floor beams 1020, one of floor beams 1020 is positioned between doubler 1460 and second strut 1430. Specifically, doubler 1460 is positioned against first side 1024 of one of floor beams 1020, while second strut 1430 is positioned against second side 1026 of one of floor beams 1020. In some examples, plurality of fastener openings 1027 is formed through second strut 1430, one of floor beams 1020, and doubler 1460 using, for example, a drill. Plurality of second fasteners 1490 installed through one of plurality of fastener openings 1027 to interconnect second strut 1430, one of floor beams 1020, and doubler 1460 are, for example, HI-LOK® fasteners, bolts, screws, and rivets.

Referring generally to FIG. 6 and particularly to, e.g., FIG. 5B, according to method 6000, one of plurality of second fasteners 1490 is installed through one of tabs 1436, at least partially covering opening 1023 in one of floor beams 1020. The preceding subject matter of this paragraph characterizes example 81 of the present disclosure, wherein example 81 also includes the subject matter according to example 80, above.

One tab of tabs 1436, overlapping the portion of opening 1023, provides support to second strut 1430 relative to one of floor beams 1020 even though this one of tabs 1436 or at least some parts of this one of tabs 1436 does not directly interface with one of floor beams 1020.

In some examples, at least one of tabs 1436 overlaps at least a portion of opening 1023 in one of floor beams 1020 for attachment to spacer 1440 positioned in opening 1023 and doubler 1460 positioned on the other side of one of floor beams 1020. As such, one of tabs 1436 serves as a support feature for spacer 1440 and doubler 1460. This one of tabs allows positioning second face wall 1434 away from opening 1023.

Referring generally to FIG. 6 and particularly to, e.g., FIG. 5C-2, according to method 6000, one of plurality of second fasteners 1490 is installed through second face wall 1434 of second strut 1430. The preceding subject matter of this paragraph characterizes example 82 of the present disclosure, wherein example 82 also includes the subject matter according to example 80, above.

In some examples, one or more of plurality of second fasteners 1490 are used for attachment of second strut 1430 directly to one of floor beams 1020, attachment of second strut 1430 to spacer 1440 and doubler 1460, attachment of doubler 1460 to one of floor beams 1020, or various combinations of these attachments.

In some examples, one of plurality of second fasteners 1490 protrudes through second face wall 1434 of second strut 1430 and wall 1025 of one of floor beams 1020. Furthermore, another one of plurality of second fasteners 1490 fastener protrudes through one of tabs 1436 of second strut 1430, spacer 1440, and doubler 1460, attaching these three components together. Some examples of plurality of second fasteners 1490 include, but are not limited to, HI-LOK® fasteners, bolts, screws, and rivets.

Referring generally to FIG. 6 and particularly to, e.g., FIG. 5B, according to method 6000, one of plurality of second fasteners 1490 is installed through another one of tabs 1436, extending away from opening 1023 in one of floor beams 1020. The preceding subject matter of this paragraph characterizes example 83 of the present disclosure, wherein example 83 also includes the subject matter according to example 80, above.

In some examples, Tabs 1436 of second strut 1430 are used to increase the interface area with one of floor beams 1020. For example, one of tabs 1436 extends away from opening 1023. One of tabs 1436 is secured by one of plurality of second fasteners 1490 for attaching second strut 1430 directly to one of floor beams 1020.

In some examples, fastener opening 1070 is formed through one of tabs 1436 and floor beams 1020 and one of plurality of second fasteners 1490 is installed through fastener opening 1070. In some examples, one of plurality of second fasteners 1490 further extends through doubler 1460 positioned on another side of one of floor beams 1020 such that one of floor beams 1020 is positioned between doubler 1460 and one of tabs 1436 of second strut 1430. Some examples of plurality of second fasteners 1490 include, but are not limited to, HI-LOK® fasteners, bolts, screws, and rivets.

Referring generally to FIG. 6 and particularly to, e.g., FIG. 5B, according to method 6000, (block 6305) attaching second strut 1430 to one of floor beams 1020 further comprises (block 6330) positioning spacer 1440 into opening 1023 in one of floor beams 1020 such that at least portion of spacer 1440 is between doubler 1460 and one of tabs 1436 of second strut 1430. The preceding subject matter of this paragraph characterizes example 84 of the present disclosure, wherein example 84 also includes the subject matter according to any one of examples 80 to 83, above.

In some examples, spacer 1440 is positioned in opening 1023 to bridge the space between doubler 1460 and, for example, second strut 1430 when second strut 1430 and doubler 1460 are attached to one of floor beams 1020.

In some examples, spacer 1440 and wall 1025 of floor beams 1020 have equal thicknesses to ensure that spacer 1440 is flush with both sides of wall 1025 and interfaces with both doubler 1460 and one of tabs 1436 of second strut 1430. In some examples, one of plurality of second fasteners 1490 is installed through doubler 1460, spacer 1440, and one of tabs 1436 of second strut 1430. In some examples, when spacer 1440 is positioned into spacer 1440 into opening 1023, spacer 1440 is adhered to doubler 1460.

Referring generally to FIG. 6 and particularly to, e.g., FIG. 2, according to method 6000, (block 6305) attaching second strut 1430 to one of floor beams 1020 further comprises (block 6322) applying adhesive 1470 between doubler 1460 and first side 1024 of one of floor beams 1020 and between doubler 1460 and spacer 1440. The preceding subject matter of this paragraph characterizes example 85 of the present disclosure, wherein example 85 also includes the subject matter according to example 84, above.

In some examples, adhesive 1470 provides an adhesion bond between doubler 1460 and one of floor beams 1020 (e.g., to support doubler 1460 relative to one of floor beams 1020 during and after installation of seating-system kit 1500). Furthermore, adhesive 1470 ensures a larger contact interface between doubler 1460 and one of floor beams 1020 and more uniform load distribution between doubler 1460 and one of floor beams 1020.

In some examples, adhesive 1470 is used instead or in addition to fasteners, such as plurality of second fasteners 1490. Some examples of adhesive 1470 include, but are not limited to, epoxy adhesives, polyurethane adhesives, methyl methacrylate adhesives, silicone adhesives, and the like. Some examples of adhesive 1470, when it is a single-component adhesive, are a heat-curable adhesive, a moisture-curable adhesive (e.g., moisture in the air), and/or a radiation-curable adhesive.

Referring generally to FIG. 6 and particularly to, e.g., FIG. 5G, according to method 6000, (block 6305) attaching second strut 1430 to one of floor beams 1020 further comprises (block 6310) detaching bracket 1040 from one of floor beams 1020, (block 6365) forming an additional one of plurality of fastener openings 1027 through doubler 1460, and (block 6385) installing another one of plurality of second fasteners 1490 through additional one of plurality of fastener openings 1027 and bracket 1040 to interconnect bracket 1040, one of floor beams 1020, and doubler 1460. The preceding subject matter of this paragraph characterizes example 86 of the present disclosure, wherein example 86 also includes the subject matter according to any one of examples 80 to 85, above.

In some examples, bracket 1040 is positioned near the attachment point of second strut 1430 to one of floor beams 1020. At the same time, doubler 1460 is used to reinforce one of floor beams 1020 and to redistribute loads throughout one of floor beams 1020 to avoid excessive stresses near opening 1023 in one of floor beams 1020 and/or near the attachment point of bracket 1040 to one of floor beams 1020.

In some examples, doubler 1460 extends over the attachment point of bracket 1040 to one of floor beams 1020 and reinforce one of floor beams 1020 at that point. To prevent interference between fasteners, supporting bracket 1040 relative to one of floor beams 1020, bracket 1040 is detached. Doubler 1460 is positioned against one of floor beams 1020 such that one of floor beams 1020 is disposed between doubler 1460 and bracket 1040. Bracket 1040 is then reattached using one of plurality of second fasteners 1490, which protrudes through bracket 1040, one of floor beams 1020, and doubler 1460.

Referring generally to FIG. 1 and particularly to, e.g., FIG. 6, according to method 6000, (block 6300) attaching plurality of struts 1410 to one of floor beams 1020 comprises (block 6302) attaching first strut 1420 to one of floor beams 1020. The preceding subject matter of this paragraph characterizes example 87 of the present disclosure, wherein example 87 also includes the subject matter according to any one of examples 78 to 86, above.

Plurality of struts 1410 are also attached to secondary pair of seat tracks 1310 and support secondary pair of seat tracks 1310 relative to floor beams 1020. Attachment of plurality of struts 1410 to one of floor beams 1020 provides this support.

Various forms of attachment of plurality of struts 1410 to one of floor beams 1020 are within the scope of the present disclosure, such as installing fasteners e.g., plurality of second fasteners 1490), applying adhesive 1470, and the like. When opening 1023 is present in one of floor beams 1020, plurality of struts 1410 is attached to one of floor beams 1020 in areas away from opening 1023.

Referring generally to FIG. 6 and particularly to, e.g., FIGS. 5B and 5C-1, according to method 6000, first strut 1420 comprises two first parallel side walls 1422 and first face wall 1424 that connects two first parallel side walls 1422 and (block 6302) attaching first strut 1420 to one of floor beams 1020 comprises installing multiple ones of plurality of second fasteners 1490 through first face wall 1424 and one of floor beams 1020. The preceding subject matter of this paragraph characterizes example 88 of the present disclosure, wherein example 88 also includes the subject matter according to example 87, above.

In some examples, first face wall 1424 of first strut 1420 are positioned against floor beam 1020. One or more of plurality of second fasteners 1490 is installed through first face wall 1424 and one of floor beams 1020, thereby securing first strut 1420 relative to one of floor beams 1020.

The number of fasteners of plurality of second fasteners 1490 installed through first face wall 1424 and one of floor beams 1020 depends on the height of first strut 1420. Some examples of plurality of second fasteners 1490 include, but are not limited to, HI-LOK® fasteners, bolts, screws, and rivets.

Examples of present disclosure may be described in context of aircraft manufacturing and service method 800 as shown in FIG. 8 and aircraft 700 as shown in FIG. 7. During pre-production, illustrative method 800 may include specification and design block 804 of aircraft 700 and material procurement block 806. During production, component and subassembly manufacturing block 808 and system integration block 810 of aircraft 700 may take place. Thereafter, aircraft 700 may go through certification and delivery block 812 to be placed in service block 814. While in service, aircraft 700 may be scheduled for routine maintenance and service block 816. Routine maintenance and service may include modification, reconfiguration, refurbishment, etc. of one or more systems of aircraft 700.

Each of processes of illustrative method 800 may be performed or carried out by system integrator, third party, and/or an operator e.g., customer. For purposes of this description, system integrator may include, without limitation, any number of aircraft manufacturers and majorsystem subcontractors; third party may include, without limitation, any number of vendors, subcontractors, and suppliers; and an operator may be an airline, leasing company, military entity, service organization, and so on.

As shown in FIG. 8, aircraft 700 produced by illustrative method 800 may include airframe 1118 with plurality of high-level systems 750 and interior 770. Examples of high-level systems 750 include one or more of propulsion system 730, electrical system 740, hydraulic system 760, and environmental system. Any number of other systems may be included. Although an aerospace example is shown, principles disclosed herein may be applied to other industries, such as automotive industry. Accordingly, in addition to aircraft 700, principles disclosed herein may apply to other vehicles, e.g., land vehicles, marine vehicles, space vehicles, etc.

Apparatuses and methods shown or described herein may be employed during any one or more of stages of manufacturing and service method 800. For example, components or subassemblies corresponding to component and subassembly manufacturing block 808 may be fabricated or manufactured in manner similar to components or subassemblies produced while aircraft 700 is in service block 814. Also, one or more examples of apparatuses, methods, or combination thereof may be utilized during production stages (block 808 and block 810), for example, by substantially expediting assembly of or reducing cost of aircraft 700. Similarly, one or more examples of apparatus or method realizations, or combination thereof, may be utilized, for example and without limitation, while aircraft 700 is in service block 814 and/or during maintenance and service block 816.

Different examples of apparatuses and methods disclosed herein include variety of components, features, and functionalities. It should be understood that various examples of apparatuses and methods disclosed herein may include any of components, features, and functionalities of any of other examples of apparatuses and methods disclosed herein in any combination, and all of such possibilities are intended to be within scope of present disclosure.

Many modifications of examples set forth herein will come to mind to one skilled in art to which present disclosure pertains having benefit of teachings presented in foregoing descriptions and associated drawings.

Therefore, it is to be understood that present disclosure is not to be limited to specific examples illustrated and that modifications and other examples are intended to be included within scope of appended claims. Moreover, although foregoing description and associated drawings describe examples of present disclosure in context of certain illustrative combinations of elements and/or functions, it should be appreciated that different combinations of elements and/or functions may be provided by alternative implementations without departing from scope of appended claims. Accordingly, parenthetical reference numerals in appended claims are presented for illustrative purposes only and are not intended to limit scope of claimed subject matter to specific examples provided in present disclosure.

What is claimed is:

1. A seating-system kit for a vehicle that comprises floor beams and a primary pair of seat tracks, attached to the floor beams, the seating-system kit comprising:
   a secondary pair of seat tracks;
   a plurality of struts, comprising at least one of a first strut type or a second strut type and configured to provide a coupling interface between the secondary pair of seat tracks and the floor beams;
   a doubler, configured to at least partially cover an opening in one of the floor beams; and
   a spacer, configured to be positioned in the opening in the one of the floor beams; and
   wherein:
      at least a portion of the spacer is between the doubler and the second type strut when the second strut type and the doubler are attached to the one of the floor beams; and
      the first strut type is geometrically different from the second strut type.

2. The seating-system kit according to claim 1, wherein:
   the first strut type comprises two first parallel side walls and a first face wall that connects the two first parallel side walls; and
   the second strut type comprises:
      two second parallel side walls;
      a second face wall, connecting the two second parallel side walls; and
      tabs, extending from opposite sides of the second face wall and perpendicular to the two second parallel side walls.

3. The seating-system kit according to claim 2, wherein surfaces of the second face wall and of the tabs of the second strut type, facing in one direction, are coplanar.

4. The seating-system kit according to claim 2, wherein:
   the tabs of the second strut type are offset relative to each other along a longitudinal axis of the second strut type; and
   the longitudinal axis is parallel to each of the two second parallel side walls and to the second face wall of the second strut type.

5. The seating-system kit according to claim 2, wherein at least one of the tabs of the second strut type is configured to overlap at least a portion of the opening in the one of the floor beams.

6. The seating-system kit according to claim 2, wherein the plurality of struts comprises struts of only the first strut type.

7. The seating-system kit according to claim 2, wherein the plurality of struts comprises struts of only the second strut type.

8. The seating-system kit according to claim 2, wherein the plurality of struts comprises struts of the first strut type and of the second strut type.

9. The seating-system kit according to claim 1, wherein a wall, containing the opening in the one of the floor beams, and the spacer have equal thicknesses.

10. The seating-system kit according to claim 1, wherein the spacer and at least a portion of the opening in the one of the floor beams have mutually complementary shapes.

11. The seating-system kit according to claim 1, wherein the spacer has a shape, corresponding to a portion of a circle.

12. The seating-system kit according to claim 1, wherein each of the secondary pair of seat tracks is formed of aluminum.

13. The seating-system kit according to claim 1, wherein the plurality of struts is formed of titanium.

14. The seating-system kit according to claim 1, wherein:
   one of the plurality of struts is configured to receive one of a plurality of first fasteners to attach the one of the plurality of struts to the secondary pair of seat tracks; and
   the one of the plurality of struts is further configured to receive one of a plurality of second fasteners to attach the one of the plurality of struts to the one of the floor beams.

15. The seating-system kit according to claim 14, further comprising the plurality of second fasteners and wherein the one of the plurality of second fasteners is configured to protrude through the one of the plurality of struts and the one of the floor beams and to attach the one of the plurality of struts to the one of the floor beams.

16. The seating-system kit according to claim 15, wherein:
   the one of the plurality of struts is the second strut type, comprising two second parallel side walls, a second face wall, connecting the two second parallel side walls, and tabs, extending from opposite sides of the second face wall and perpendicular to the two second parallel side walls; and
   the one of the plurality of second fasteners is configured to protrude through the doubler, the one of the floor beams, and one of the second face wall or one of the tabs and to attach the doubler, the one of the floor beams, and the one of the second face wall or one of the tabs.

17. The seating-system kit according to claim 14, further comprising the plurality of first fasteners, the one of the plurality of first fasteners is configured to protrude through the one of the secondary pair of seat tracks and the one of the plurality of struts and to attach the one of the secondary pair of seat tracks to the one of the plurality of struts.

18. The seating-system kit according to claim 17, wherein:
   the one of the plurality of struts is the second strut type, comprising two second parallel side walls, a second face wall, connecting the two second parallel side walls, and tabs, extending from opposite sides of the second face wall and perpendicular to the two second parallel side walls; and
   the one of the plurality of first fasteners is configured to protrude through at least one of the two second parallel side walls.

19. The seating-system kit according to claim 1, further comprising an adhesive to bond the doubler to the one of the floor beams.

20. A method of configuring a seating system of a vehicle that comprises floor beams, the seating system comprising a primary pair of seat tracks, attached to the floor beams and supporting a first seating assembly, the method comprising a step of:
   attaching a secondary pair of seat tracks to the floor beams of the vehicle such that one of the secondary pair of seat tracks is positioned between seat tracks of the primary pair of seat tracks, and wherein:
   the secondary pair of seat tracks is attached to the floor beams via:
      a plurality of struts, comprising at least one strut of a first strut type or at least one strut of a second strut type and providing a coupling interface between the secondary pair of seat tracks and the floor beams;
      a doubler, at least partially covering an opening in one of the floor beams; and
      a spacer, positioned in the opening in the one of the floor beams such that at least a portion of the spacer is between the doubler and at least one strut of the second strut type, and
   struts of the first strut type are geometrically different from struts of the second strut type.

21. The method according to claim 20, wherein the step of attaching the secondary pair of seat tracks to the floor beams of the vehicle is performed such that only one of the secondary pair of seat tracks is positioned between the seat tracks of the primary pair of seat tracks.

22. The method according to claim 21, wherein the step of attaching the secondary pair of seat tracks to the floor beams of the vehicle is performed such that only the one of the secondary pair of seat tracks is positioned between the seat tracks of the primary pair of seat tracks along its entire length.

23. The method according to claim 20, further comprising:
   prior to the step of attaching the secondary pair of seat tracks to the floor beams, detaching the first seat assembly from the primary pair of seat tracks; and
   after the step of attaching the secondary pair of seat tracks to the floor beams, reattaching the first seat assembly to the primary pair of seat tracks.

24. The method according to claim 20, further comprising:
   prior to the step of attaching the secondary pair of seat tracks to the floor beams, detaching floor panels from the primary pair of seat tracks; and
   after the step of attaching the secondary pair of seat tracks to the floor beams, attaching the floor panels to the primary pair of seat tracks and to the secondary pair of seat tracks.

25. The method according to claim 20, further comprising, after the step of attaching the secondary pair of seat tracks, a step of attaching a second seat assembly to the secondary pair of seat tracks.

26. The method according to claim 25, wherein:
   the first seat assembly comprises a first seat support and a first plurality of seats, attached to the first seat support;
   the second seat assembly comprises a second seat support and a second plurality of seats, attached to the second seat support; and
   the first plurality of seats and the second plurality of seats have equal numbers of seats.

27. The method according to claim 26, wherein:
   the step of attaching the second seat assembly to the secondary pair of seat tracks comprises a step of attaching the second seat support of the second seat assembly to the secondary pair of seat tracks, and
   the second seat support is geometrically different from the first seat support attached to the primary pair of seat tracks.

28. The method according to claim 27, wherein the step of attaching the second seat support of the second seat assembly to the secondary pair of seat tracks comprises a step of installing a plurality of third fasteners, each extending through the second seat support and one of the secondary pair of seat tracks.

29. The method according to claim 20, wherein the step of attaching the secondary pair of seat tracks to the floor beams comprises aligning the secondary pair of seat tracks to the floor beams such that each seat track in the secondary pair of seat tracks is perpendicular to each of the floor beams.

30. The method according to claim 20, wherein the step of attaching the secondary pair of seat tracks to the floor beams comprises steps of:
   attaching the plurality of struts to the floor beams; and
   attaching the secondary pair of seat tracks to the plurality of struts.

31. The method according to claim 30, wherein:
the step of attaching the plurality of struts to the one of the floor beams comprises a step of attaching the at least one of the second strut type to the one of the floor beams;
the second strut type comprises two second parallel side walls, a second face wall, connecting the two second parallel side walls, and tabs, extending from opposite sides of the second face wall and perpendicular to the two second parallel side walls; and
one of the tabs at least partially covers the opening.

32. The method according to claim 31, wherein:
the one of the floor beams comprises a first side and a second side, opposite the first side; and
the step of attaching the at least one of the second strut type to the one of the floor beams comprises:
positioning the doubler against the first side of the one of the floor beams;
positioning the at least one of the second strut type against the second side of the one of the floor beams;
forming one of a plurality of fastener openings through the at least one of the second strut type, the one of the floor beams, and the doubler; and
installing one of a plurality of second fasteners through the one of the plurality of fastener openings to interconnect the at least one of the second strut type, the one of the floor beams, and the doubler.

33. The method according to claim 32, wherein the one of the plurality of second fasteners is installed through the one of the tabs, at least partially covering the opening in the one of the floor beams.

34. The method according to claim 32, wherein the one of the plurality of second fasteners is installed through the second face wall of the at least one of the second strut type.

35. The method according to claim 32, wherein the one of the plurality of second fasteners is installed through another one of the tabs, extending away from the opening in the one of the floor beams.

36. The method according to claim 32, wherein the step of attaching the at least one of the second strut type to the one of the floor beams further comprises positioning the spacer into the opening in the one of the floor beams.

37. The method according to claim 36, wherein the step of attaching the at least one of the second strut type to the one of the floor beams further comprises applying adhesive between the doubler and the first side of the one of the floor beams and between the doubler and the spacer.

38. The method according to claim 32, wherein the step of attaching the at least one of the second strut type to the one of the floor beams further comprises:
detaching a bracket from the one of the floor beams;
forming an additional one of the plurality of fastener openings through the doubler; and
installing another one of the plurality of second fasteners through the additional one of the plurality of fastener openings and the bracket to interconnect the bracket, the one of the floor beams, and the doubler.

39. The method according claim 30, wherein the step of attaching the plurality of struts to the one of the floor beams comprises a step of attaching the at least one of the first strut type to the one of the floor beams.

40. The method according to claim 39, wherein:
the at least one of the first strut type comprises two first parallel side walls and a first face wall that connects the two first parallel side walls; and
the step of attaching the at least one of the first strut type to the one of the floor beams comprises installing multiple ones of a plurality of second fasteners through the first face wall and the one of the floor beams.

* * * * *